(12) United States Patent
Chui et al.

(10) Patent No.: US 6,657,702 B1
(45) Date of Patent: *Dec. 2, 2003

(54) FACILITATING PHOTOGRAPHIC PRINT RE-ORDERING

(75) Inventors: Jimmy Pig Fai Chui, Redwood City, CA (US); Danny D. Loh, Fremont, CA (US); Daniel R. Baum, Menlo Park, CA (US)

(73) Assignee: Shutterfly, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/450,923

(22) Filed: Nov. 29, 1999

Related U.S. Application Data

(63) Continuation-in-part of application No. 09/436,704, filed on Nov. 9, 1999, and a continuation-in-part of application No. 09/428,871, filed on Oct. 27, 1999.
(60) Provisional application No. 60/167,243, filed on Nov. 24, 1999, provisional application No. 60/159,372, filed on Oct. 14, 1999, and provisional application No. 60/151,533, filed on Aug. 31, 1999.

(51) Int. Cl.[7] .................. G03B 27/52; G03B 27/32; G03B 17/48; G06F 17/60
(52) U.S. Cl. ................. 355/40; 355/77; 358/487; 396/429; 705/26
(58) Field of Search ................. 355/40, 41, 77; 396/310, 311, 315, 319, 429; 705/26, 27; 709/218; 358/487, 527

(56) References Cited

U.S. PATENT DOCUMENTS

| | | | |
|---|---|---|---|
| 5,159,385 A | 10/1992 | Imamura | 355/28 |
| 5,179,637 A | 1/1993 | Nardozzi | 395/114 |
| 5,264,683 A | 11/1993 | Yoshikawa | 235/375 |
| 5,359,387 A | * 10/1994 | Hicks | 355/40 |
| 5,606,365 A | 2/1997 | Maurinus et al. | 348/222 |
| 5,696,850 A | 12/1997 | Parulski et al. | 382/261 |
| 5,715,034 A | * 2/1998 | Yamamoto | 355/39 |
| 5,748,194 A | 5/1998 | Chen | 345/427 |
| 5,751,950 A | 5/1998 | Crisan | 395/188 |
| 5,760,916 A | 6/1998 | Dellert et al. | 358/408 |
| 5,760,917 A | 6/1998 | Sheridan | 358/442 |
| 5,778,430 A | 7/1998 | Ish et al. | 711/133 |
| 5,787,459 A | 7/1998 | Stallmo et al. | 711/112 |
| 5,787,466 A | 7/1998 | Berliner | 711/117 |
| 5,790,708 A | 8/1998 | Delean | 382/276 |
| 5,806,005 A | 9/1998 | Hull et al. | 455/566 |
| 5,809,280 A | 9/1998 | Chard et al. | 395/487 |
| 5,825,467 A | 10/1998 | Narita | 355/40 |
| 5,835,735 A | 11/1998 | Mason et al. | 395/287 |
| 5,890,213 A | 3/1999 | Sokolov | 711/113 |

(List continued on next page.)

FOREIGN PATENT DOCUMENTS

| | | | |
|---|---|---|---|
| EP | 0851292 A2 | | 7/1998 |
| EP | 0 856 972 A2 | * | 8/1998 |
| EP | 0 878 956 A1 | * | 11/1998 |
| EP | 0890877 A2 | | 1/1999 |
| EP | 0851292 A3 | | 11/1999 |
| EP | 0890877 A3 | | 1/2000 |
| WO | WO 97/39580 | | 10/1997 |
| WO | WO 98/36556 | | 8/1998 |

OTHER PUBLICATIONS

PCT International Search Report, PCT/US00/40799, Mar. 19, 2001, European Patent Office.

Primary Examiner—Alan A. Mathews
(74) Attorney, Agent, or Firm—Tran & Associates

(57) ABSTRACT

A method facilitates photographic print re-ordering by encoding a photographic print with an identifier identifying a recipient of the photographic print and one or more printing parameters associated with the photographic print.

35 Claims, 16 Drawing Sheets

U.S. PATENT DOCUMENTS

| | | |
|---|---|---|
| 5,903,728 A | 5/1999 | Semenzato .................. 395/200 |
| 5,907,640 A | 5/1999 | Delean ....................... 382/276 |
| 5,913,088 A | 6/1999 | Moghadam et al. ........ 396/311 |
| 5,918,213 A | 6/1999 | Bernard et al. ............... 705/26 |
| 5,926,288 A | 7/1999 | Dellert et al. ............... 358/487 |
| 5,933,646 A | 8/1999 | Hendrickson et al. ...... 395/712 |
| 5,960,411 A | 9/1999 | Hartman et al. .............. 705/26 |
| 5,974,401 A * | 10/1999 | Enomoto et al. ............. 355/40 |
| 5,995,196 A * | 11/1999 | Nishida et al. ................ 355/27 |
| 6,017,157 A * | 1/2000 | Garfinkle et al. ............. 355/40 |
| 6,157,435 A * | 12/2000 | Slater et al. ................... 348/96 |
| 6,169,596 B1 * | 1/2001 | Shiota ......................... 355/40 |
| 6,181,409 B1 * | 1/2001 | Calhoun ...................... 355/39 |
| 6,198,526 B1 * | 3/2001 | Ohtsuka ..................... 348/232 |
| 6,373,551 B2 * | 4/2002 | Manico et al. ................ 355/41 |
| 6,381,418 B1 * | 4/2002 | Spurr et al. ................... 355/40 |

* cited by examiner

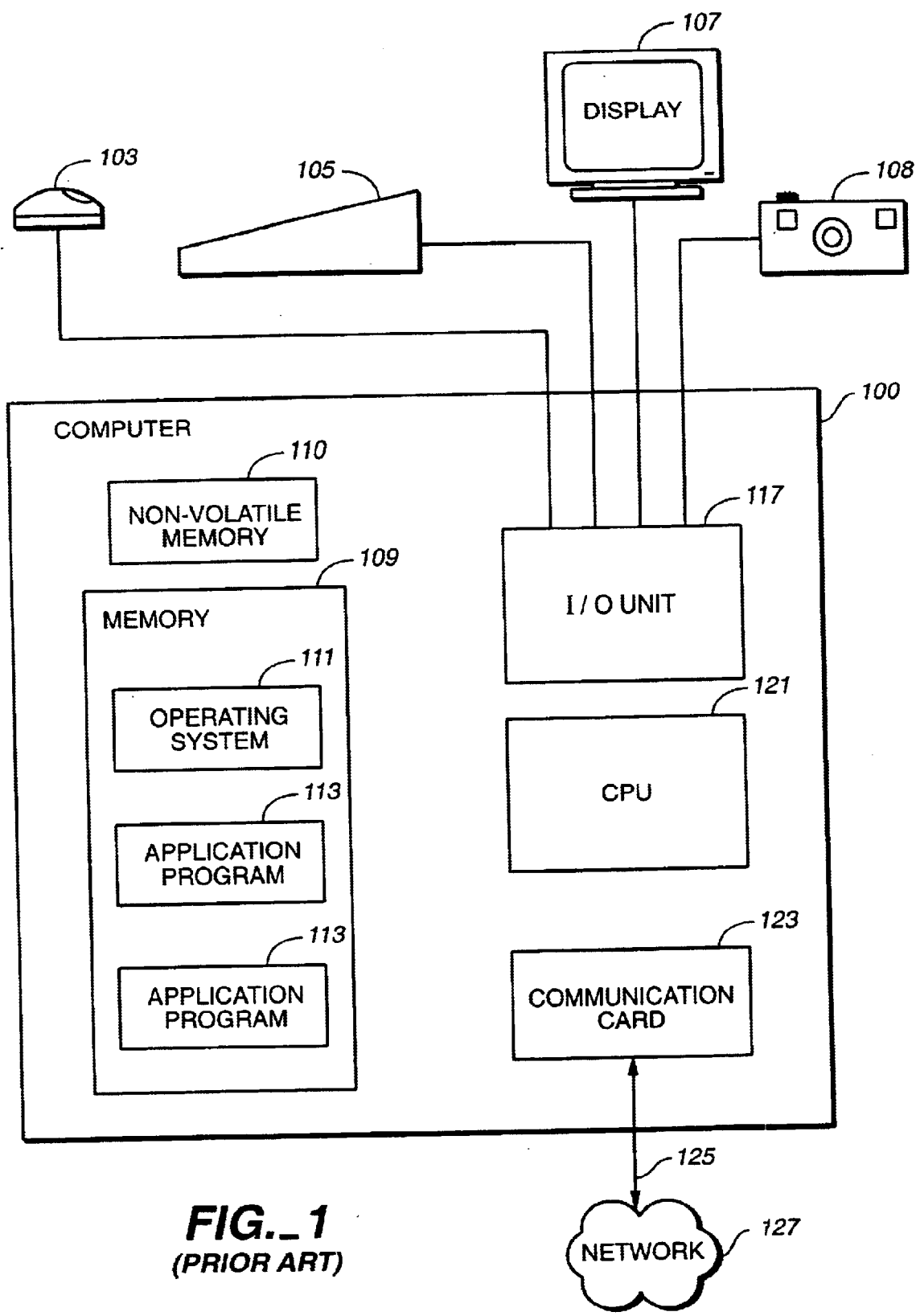
FIG._1
*(PRIOR ART)*

| 200

| Online Print Service |

202 — First Name: [　　　　　　　　　　]
204 — Last Name: [　　　　　　　　　　]
206 — Address: [　　　　　　　　　　　]
208 — City: [　　　　　　　　　　　　]
210 — State: [　　　　　　　　　　　]
212 — Country: [　　　▽]　　216
214 — Phone: [　　　]　　Fax: [　　]
218 — Email: [　　　　　　　　　　　]

220
[<Back] [Next>] [Cancel] [Help]

*FIG._2A*
*(PRIOR ART)*

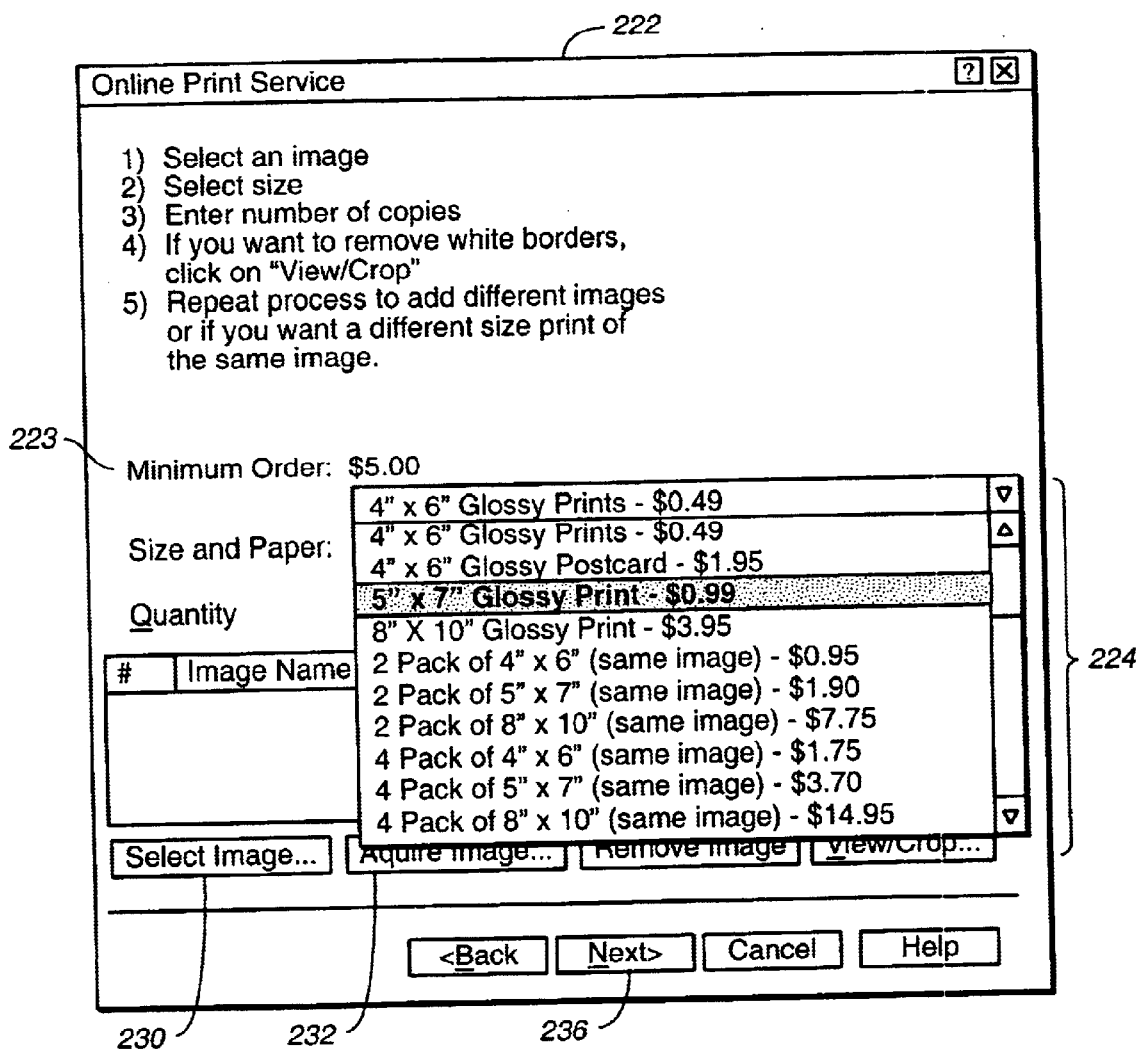
FIG._2B
(PRIOR ART)

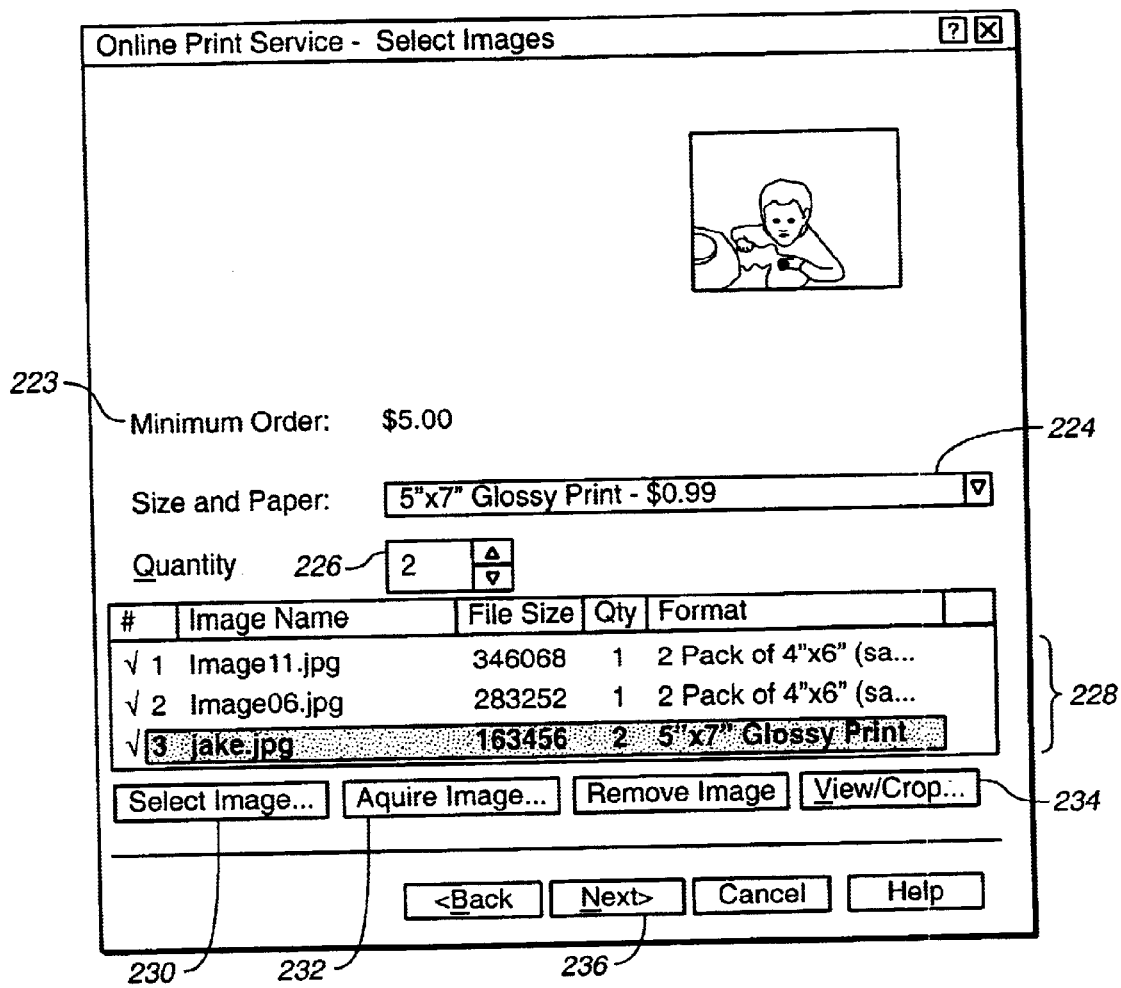
FIG._2C
(PRIOR ART)

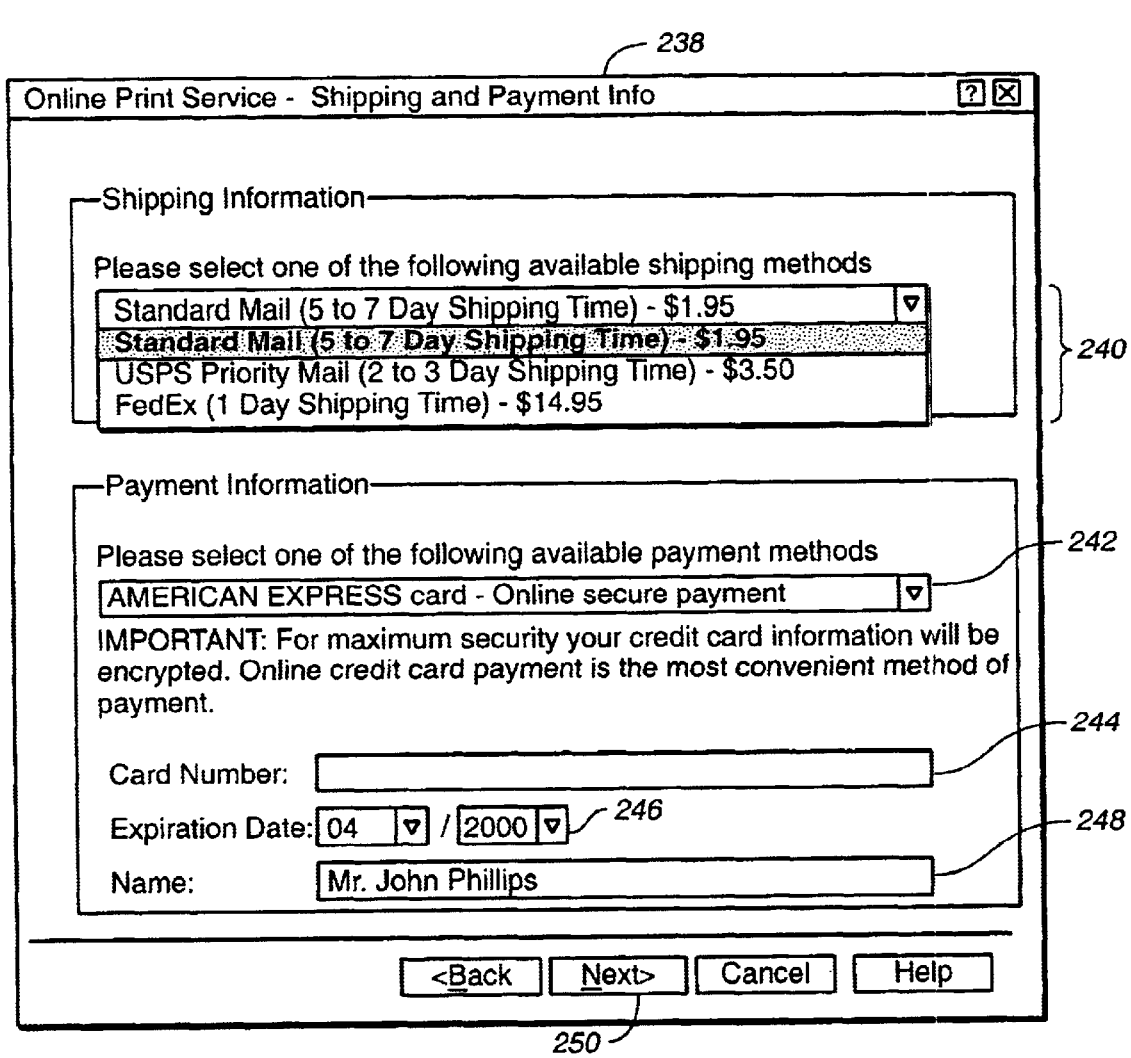
FIG._2D
(PRIOR ART)

250

| Online Print Service - Shipping and Payment Info | | | | ? ☒ |
|---|---|---|---|---|

Your order is ready to be processed. Please verify the information below Press Finish if Ok, otherwise you can go Back to correct your order.

All prices are in US Dollars

| N⁺ | Description | Unit Price | Qty | Price |
|---|---|---|---|---|
| 1 | 2 Pack of 4"x6" (same image) | $0.95 | 1 | $0.95 |
| 2 | 2 Pack of 4"x6" (same image) | $0.95 | 1 | $0.95 |
| 3 | 5"x7" Glossy Print | $0.99 | 2 | $1.98 |
| 4 | 5"x7" Glossy Print | $0.99 | 2 | $1.98 |

} 252

Subtotal $5.86
Shipping & Handling $1.95
Total $7.81

— 254

Payment method: AMERICAN EXPRESS card - Online secure
A confirmation wil be sent to
this e-mail address: phillips@fr.com

[ <Back ] [ Finish ] [ Cancel ] [ Help ]

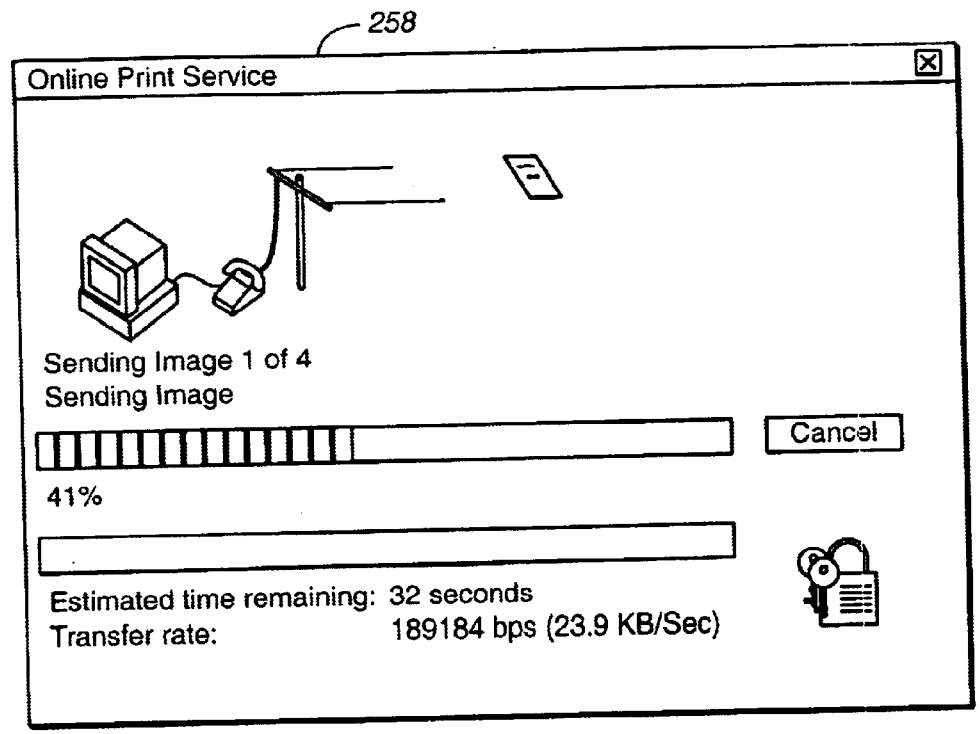
FIG._2F
*(PRIOR ART)*
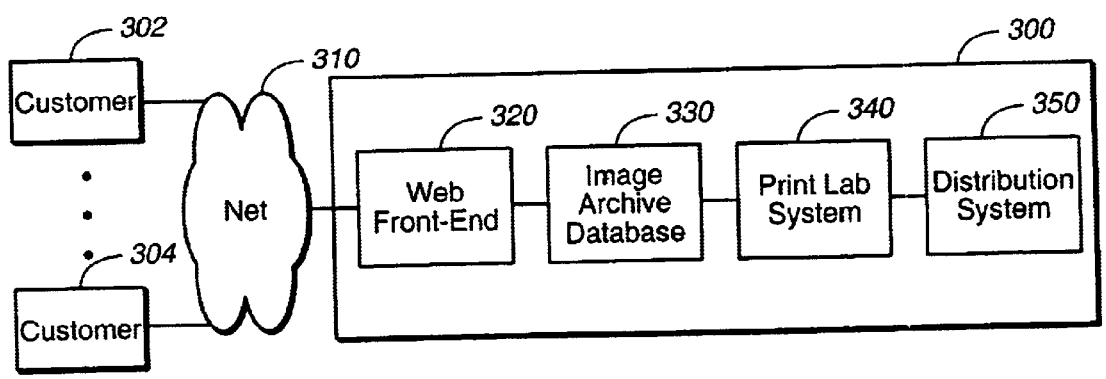
FIG._3A

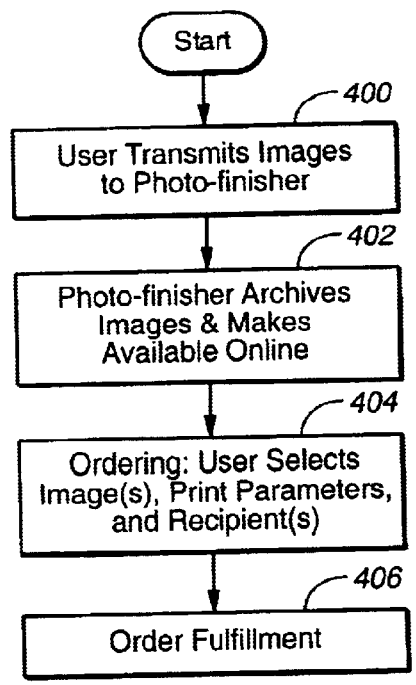
FIG._4
| DISTRIBUTION ALIAS: FAMILY ||||||
| Member 604 | Contact Info 606 | Defaults 608 | Delivery Options 610 | ......... 612 |
|---|---|---|---|---|
| DAD | | | | |
| MOM | | | | |
| SPOUSE | | | | |
| SISTER | | | | |
| BROTHER | | | | |
| GRANDMA | | | | |
FIG._6

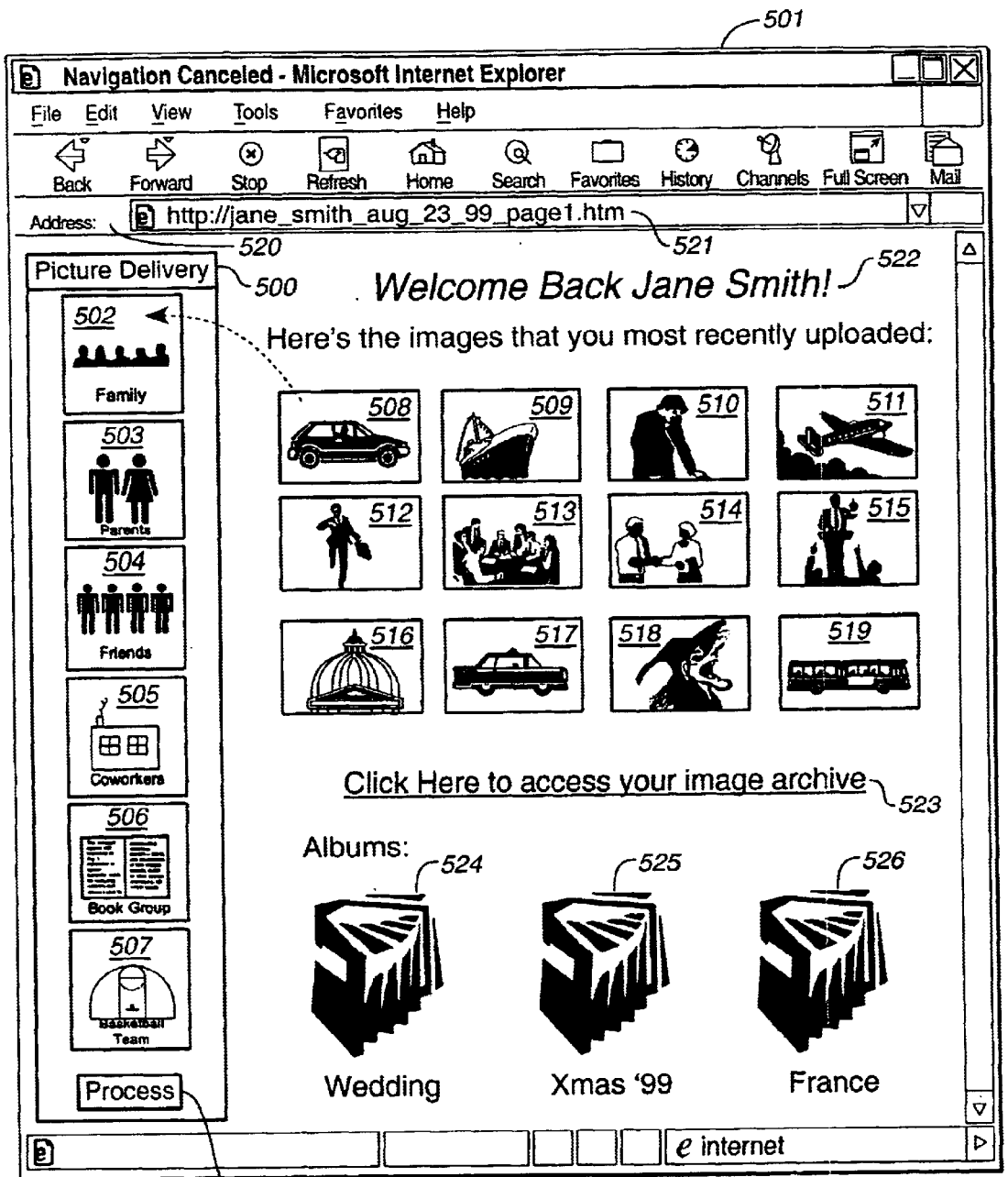
FIG._5

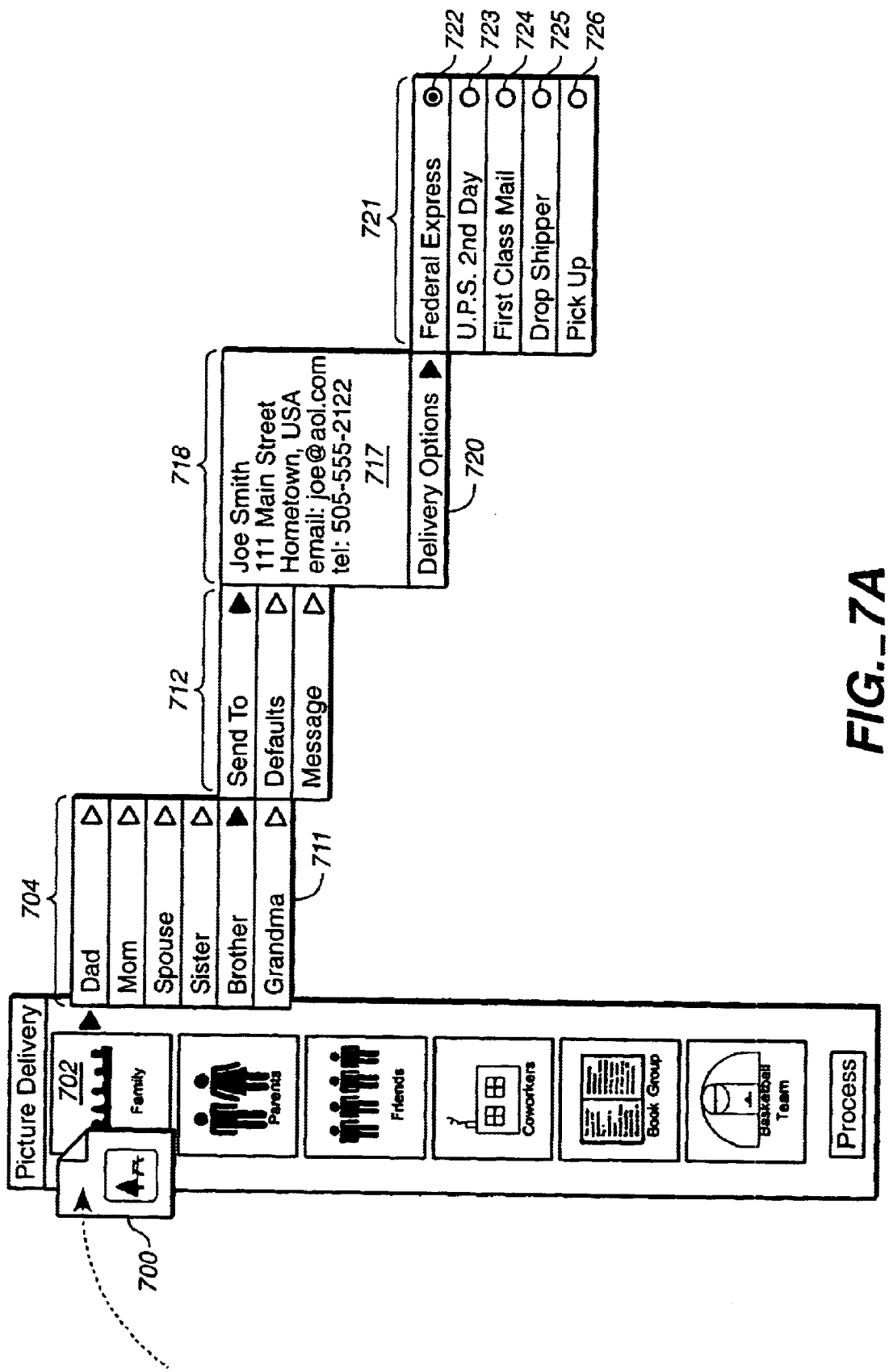
FIG._7A

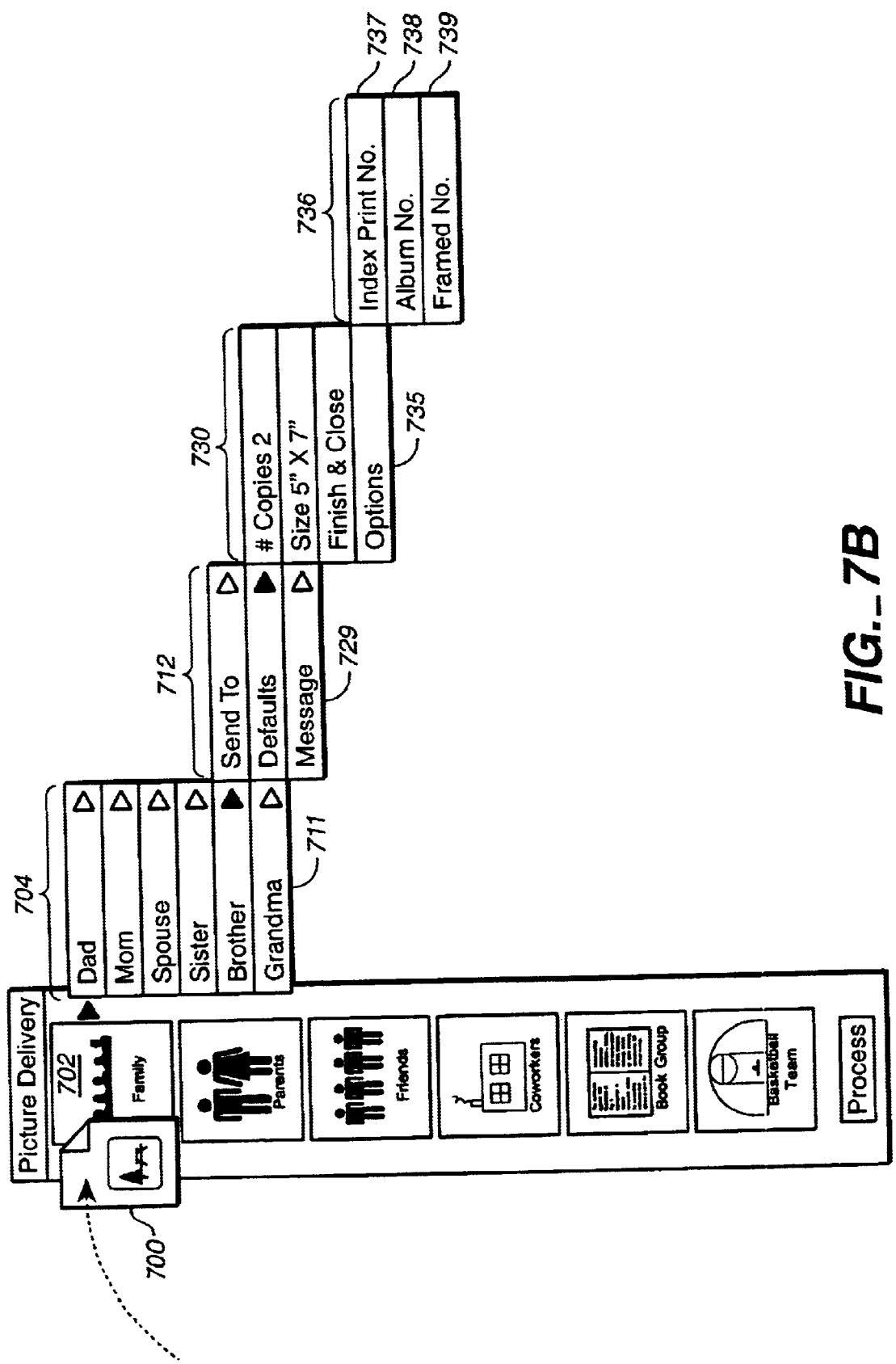
FIG._7B

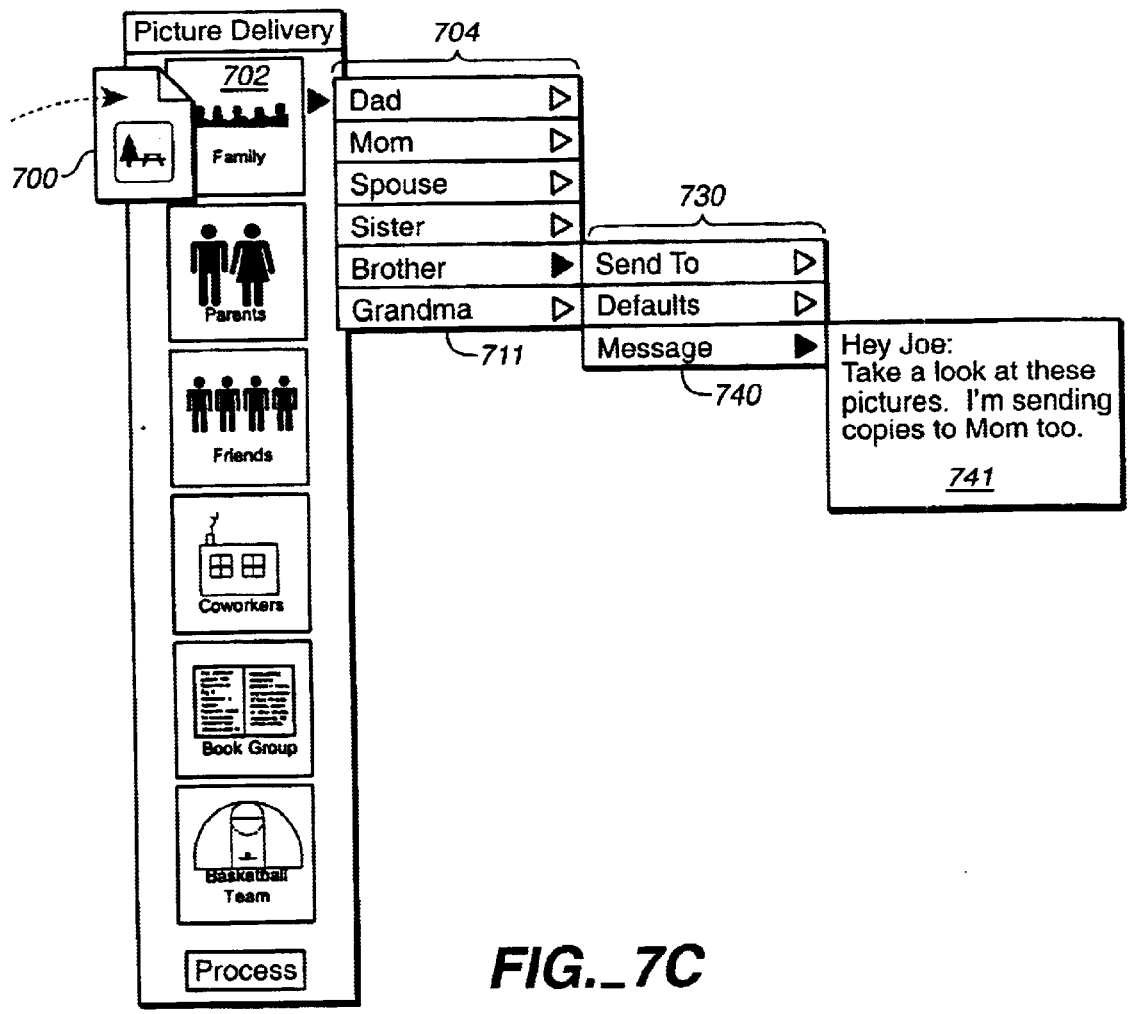
FIG._7C

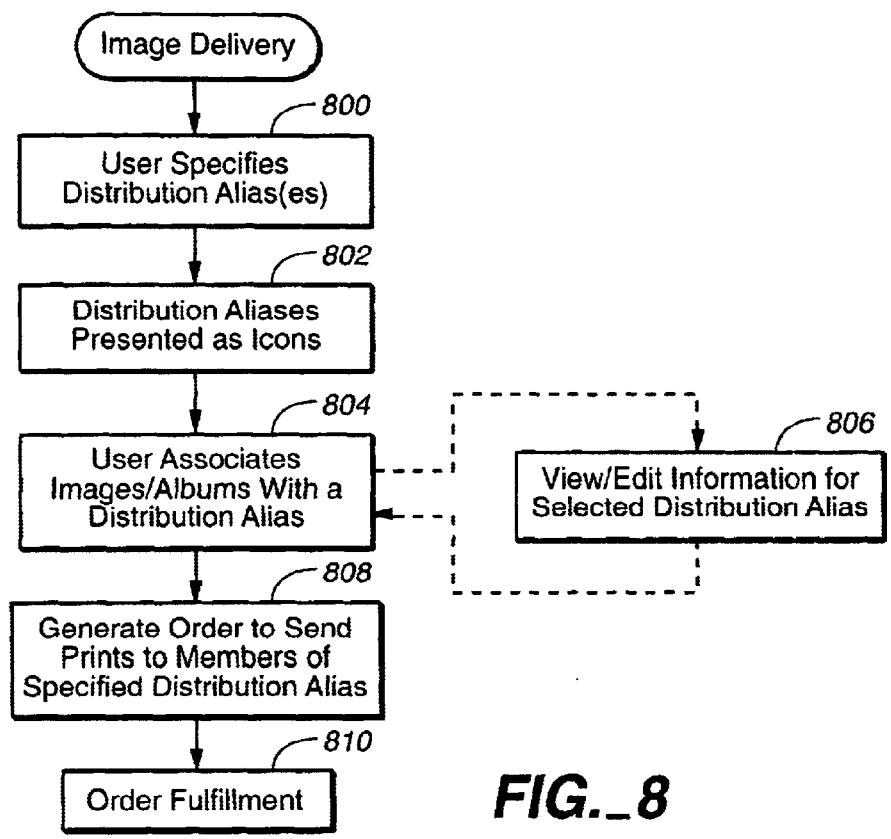
FIG._8
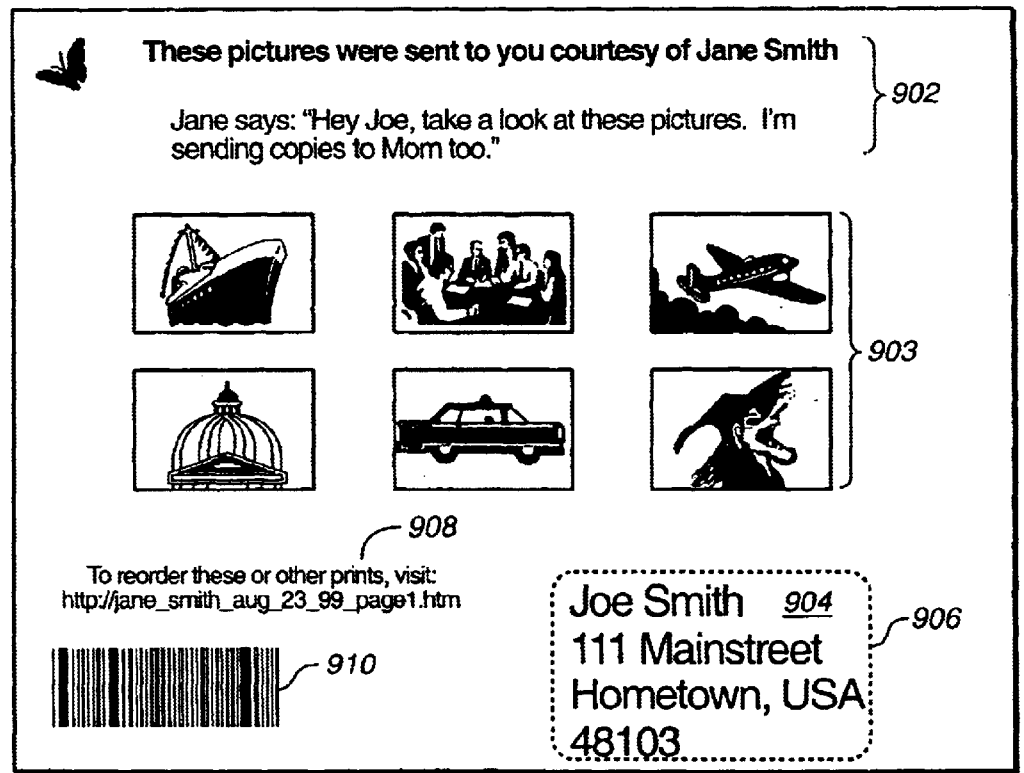
FIG._9

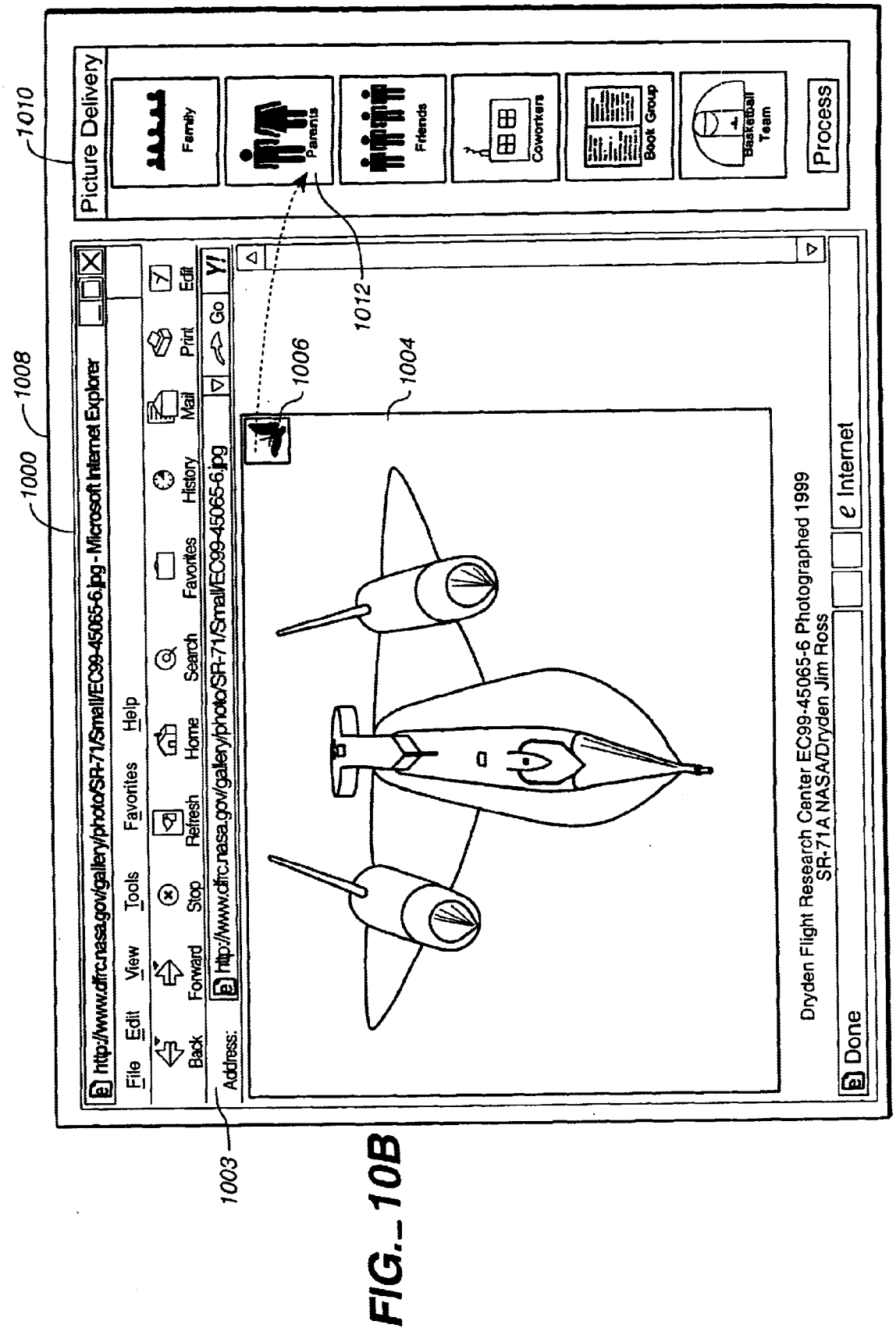
FIG._10B

FACILITATING PHOTOGRAPHIC PRINT RE-ORDERING

This application is a continuation in part of U.S. provisional patent applications S/No. 60/151,533, filed Aug. 31, 1999; Ser. No. 60/159,372, filed Oct. 14, 1999; Ser. No. 09/428,871, filed Oct. 27, 1999; Ser. No. 09/436,704, filed Nov. 9, 1999; and Ser. No. 60/167,243, entitled "Digital Photo Printing Service", filed Nov. 24, 1999, the contents of which are hereby incorporated by reference.

TECHNICAL FIELD

This application relates to facilitating re-ordering of photographic prints.

BACKGROUND

The computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 (e.g., a telephone line).

The computer 100 of FIG. 1 also can be connected to various peripheral I/O devices. One of the more popular of such peripheral devices is a digital camera 108 that enables users to take pictures and save them in digital (electronic) format. Typically, the digital camera 108 is connected to the computer 100 only while the user is uploading images to the computer's disk drive or other non-volatile memory 110. Users also can obtain digital images, for example, of film-based prints from a traditional camera, by sending an exposed film into a photo-finishing service, which develops the film to make prints and then scans (or otherwise digitizes) the prints or negatives to generate digital image files. The digital image files then can be transmitted back to the user by e-mail or on a CD-ROM, diskette, or other removable storage medium.

In any event, once the digital images are stored on the computer 100, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on the computer display 107, users often desire to have hard copies (physical prints) made of digital images. Such hard copies can be generated locally by the user using output devices such an inkjet printer or a dye sublimation printer. In addition, users can transmit digital images (e.g., either over a computer network or by using a physical storage medium such as a floppy disk) to a photo-finishing service, which can make hard copies of the digital images and send them (e.g., by U.S. Mail or courier service) back to the user.

FIGS. 2A–2F show a sequence of screen shots that a user might encounter when transmitting digital images to a photo-finishing service to have hard copies (prints) made of the images. In FIG. 2A, the user first encounters a contact information window 200 in which the user must enter several items of contact information such as first and last names 202, 204, address 206, city 208, state 210, country 210, phone 214, fax 216, and Email address 218. This information typically is required by the photo-finishing service for purposes of billing and shipping.

After the user has entered the required information, the user presses the Next button 220 to arrive at the next screen—an image selection window 222 as shown in FIGS. 2B and 2C. In the image selection window 222, the user designates the specific images of which hard copies are to be made. The digital images either can be selected from among the images stored on the user's computer by clicking the "Select Image . . . " button 230 or they can be acquired from a digital camera or scanner attached to the user's computer by clicking the "Acquire Image . . . " button 232. Once selected, the images can be viewed and/or cropped by clicking on the "View/Crop" button 234. In addition, the user can designate the hard copy format and other parameters (e.g., size, number of copies, paper type) for each of the selected images by selecting or entering the desired options using drop-down list 224 and text box 226. The selected images and their associated parameters are shown in display area 228. Typically, each order for prints must meet a minimum order amount 223 (e.g., five dollars).

After the images and their respective hard copy parameters have been selected, the user clicks the Next button 236 and a shipping and payment information window 238 is presented. In this window 238, the user selects a desired shipping method from drop-down list 240 and specifies a method of payment and associated verification information in text boxes 242, 244, 246 and 248.

After this information has been provided, the user clicks the Next button 250 and is presented with an order confirmation window as shown in FIG. 2E. The order verification window 250 allows the user to view and confirm the order including the images selected and their respective parameters in display area 252, as well as the price of the order 254. If the user is satisfied with the order, the user clicks the Finish button 256 to complete the order.

Upon completing the order, the images are uploaded to the photo-finishing service as indicated by the upload window 258 in FIG. 2F. Once the images are uploaded, the photo-finishing service arranges to have prints made of the selected images and to have the prints mailed to the user and address specified in the contact information window 200. If the user desires to have prints of the same (or different) images sent to another person (e.g., a family member or friend), the user typically must repeat the entire order generating process represented by FIGS. 2A–2F. Generally, repeating the ordering process to send prints to another person involves entering a considerable amount of redundant information and incurring separate charges, including multiple minimum order charges, on the user's credit card (or other financial instrument).

The present inventors recognized that it would be advantageous to provide users with a intuitive and robust environment in which a user can order image prints to be distributed to multiple recipients while minimizing the user's time, effort, and expense in placing the order.

SUMMARY

Implementations may include various combinations of the following features.

In one aspect, a computer-implemented method of distributing image prints to a plurality of recipients (including, e.g., an individual, a business entity, and/or an address) may include receiving an order specifying a plurality of recipients (e.g., where at least one of the specified recipients is different from a user from whom the order was received) and, for each specified recipient, a set of one or more images associated with that recipient. The method also may include, for each of the plurality of recipients specified in the received order, printing at least one copy of each image in the recipient's image set and distributing the printed image copies to their respective associated recipients.

The images and print parameters (e.g., print size, number of copies, print finish, and/or a textual message) of a first recipient's image set may differ from images and print parameters of a second recipient's image set. The print parameters also may differ among images within an image set. Each image set may include an arbitrary grouping of images designated by a user. Furthermore, the order may include a single transaction sequence such as a single charge to a financial instrument (e.g., a credit card, a debit card, electronic funds transfer, a gift certificate, or a coupon) that may be terminated by a click of an "order" button.

The receiving, printing and distributing can be performed by a single entity or can be dispersed among two or more different entities. For example, receiving an order can be performed by an enterprise providing a web front-end, and/or printing or distributing, or both, can be performed by a fulfillment enterprise different than the enterprise providing the web front-end. Printing and distributing may be an integrated process, may be performed by a single entity, and/or may be performed by different entities.

The method also may include, prior to printing, dividing the received order into a plurality of sub-orders, each sub-order corresponding to a different recipient. The received order may be divided into the plurality of sub-orders, for example, by instantiating, for each image in the received order, a copy of the image (e.g., a digital image file) for each recipient designated to receive a print of that image. Printing, for example, may include printing a set of one or more images in each sub-order and/or printing a run of prints associated with a specified recipient for each sub-order. Furthermore, the method may include printing a destination identifier, which may identify the specified recipient for a corresponding run of prints and/or delimit a corresponding sub-order. The destination identifier may include one or more of the following items: a shipping address, a recipient's name, an index of thumbnail images, a bar code, a textual message and/or print re-ordering information. Moreover, a first image in a sub-order may have one or more print parameters that differ from one or more print parameters of a second image in the sub-order. In addition, dividing the received order into the plurality of sub-orders may be performed by a first entity (e.g., a photo-finishing enterprise) and printing the sub-orders may be performed by a second entity (e.g., a goods/service provider enterprise such as a supermarket, a drugstore, a post office, or an online grocer). Distributing the printed image copies further may include delivering a recipient's printed image copies along with an unrelated order of goods/services associated with that recipient.

In another aspect, a computer-implemented method of distributing physical manifestations of digital content to a plurality of recipients may include receiving an order specifying a plurality of recipients and, for each specified recipient, a set of digital content (e.g., one or more digital images) associated with that recipient. The method may also include for each of the plurality of recipients specified in the received order, generating a physical manifestation of the digital content in the recipient's digital content set, and distributing the physical manifestations to their respective associated recipients. The physical manifestation of the digital content may include photographic prints of the one or more digital images, framed photographic prints, photo-album pages bearing one or more digital images, compositions of digital images and other graphical and/or textual content, and/or artifacts bearing a digital image such as a novelty item, a shirt, a coffee mug, a key-chain, a mouse pad, a magnet, or a deck of playing cards.

Optionally, the set of digital content may include graphical and/or textual content, and the physical manifestation of the set of digital content may include a card (e.g., a greeting card, a holiday card, an announcement, a playing card, a post card, a thank you card, or an invitation), an advertisement, a coupon, and/or a bound volume (e.g., a photo-album or a travel book) bearing the graphical and/or textual content. The graphical and/or textual content can include digital images, digitized content, and/or computer-generated content.

In another aspect, a computer-implemented method of distributing photographic prints to a plurality of recipients may include receiving an order specifying (i) a plurality of recipients, (ii) for each specified recipient, a set of one or more digital images associated with that recipient, and (iii) for each digital image, a set of one or more print parameters (e.g., print size, number of copies, print finish, and/or a textual message). The method also may include dividing the received order into a plurality of sub-orders so that each sub-order corresponds to a different specified recipient and includes an instance of each digital image associated with the recipient corresponding to the sub-order. The method further may include printing the instantiated digital images in each of the sub-orders according to the print parameters associated with each image, and distributing the prints to their respective associated recipients. The order may be received by receiving interactive input from a user of a computer system (e.g., the user's personal computer system or a public entry terminal).

Receiving, dividing, printing and distributing may be performed by a single entity or may be dispersed among two or more different entities. For example, receiving an order may be performed by an enterprise providing a web front-end and one or more of dividing, printing and distributing may be performed by a fulfillment enterprise different than the enterprise providing the web front-end. Moreover, printing and distributing may be an integrated process, may be performed by a single entity, and/or may be performed by different entities.

The method further may include printing a destination identifier that identifies the specified recipient for a corresponding sub-order. The destination identifier may delimit a corresponding sub-order and/or may include one or more of the following items: a shipping address, a recipient's name, an index of thumbnail images, a bar code, a textual message and/or print re-ordering information. Furthermore, a first image in a sub-order may have print parameters that differ from print parameters of a second image in the sub-order.

Also, dividing the received order into the plurality of sub-orders may be performed by a first entity (e.g., a photo-finishing enterprise) and printing the sub-orders may be performed by a second entity (e.g., a goods/service provider enterprise such as a supermarket, a drugstore, a post office, or an online grocer). Furthermore, distributing the prints may include delivering a recipient's prints along with an unrelated order of goods/services associated with that recipient.

In another aspect, a method of distributing photographic prints to users may include receiving from a user a computer-readable medium bearing one or more digital images, processing the one or more digital images to generate one or more photographic prints, storing computer software on the computer-readable medium received from the user, and sending the one or more photographic prints and the computer-readable medium storing computer software to the user.

The computer-readable medium received from the user may include a FLASH memory, a writeable CD-ROM, or a diskette. The computer software stored on the computer-readable medium may include executable software for image viewing and/or editing, a client program for communicating with a host system maintained by a photo-finisher, a driver program for controlling behavior of a computer system or a printer or both, and/or calibration data (e.g., calibration data that can be used to calibrate color characteristics of the user's digital images or can be used to modify the appearance of the user's digital images on a computer monitor or on a printing device or both). For example, the computer-readable medium received from the user may include a FLASH memory readable by a digital camera and/or may store computer software that includes data that controls behavior of the digital camera.

In another aspect, a print distribution system may include a front-end computer sub-system for receiving an order specifying a plurality of recipients (including, e.g., an individual, a business entity, and/or an address) and, for each specified recipient, a set of one or more images associated with that recipient. The system also may include a printing sub-system for printing at least one copy of each image in each recipient's image set, and a distribution sub-system for distributing the printed image copies to their respective associated recipients. At least one of the specified recipients may be different from a user from whom the order was received.

The images in a first recipient's image set may differ from images in a second recipient's image set, and print parameters (e.g., print size, number of copies, print finish, and/or a textual message) of the first recipient's image set may differ from printing parameters of the second recipient's image set. The print parameters may differ among images within an image set, and each image set may include an arbitrary grouping of images designated by a user that placed the order.

The front-end computer sub-system, the printing sub-system, and the distribution sub-system may be dispersed among two or more different entities. For example, the front-end computer sub-system may correspond to an enterprise providing a web front-end, and the printing sub-system or the distribution sub-system, or both, may correspond to a fulfillment enterprise different than the enterprise providing the web front-end. The printing sub-system and the distribution sub-system may be controlled by a single entity, may be integrated, and/or may be controlled by the same entity or may be controlled by different entities.

Optionally, the printing sub-system may include a sub-system for dividing the received order into a plurality of sub-orders so that each sub-order corresponds to a different recipient. The printing sub-system may print a set of one or more images in each sub-order and/or may print a run of prints associated with a specified recipient for each sub-order. The printing sub-system also may print a destination identifier that identifies the specified recipient for a corresponding run of prints. The destination identifier may delimit a corresponding sub-order and/or may include one or more of the following items: a shipping address, a recipient's name, a thumbnail image index, a bar code, a textual message and/or print re-ordering information.

Dividing the received order into the plurality of sub-orders may include instantiating, for each image in the received order, a copy of the image for each recipient designated to receive a print of that image. An instantiated copy may include a digital image file. Moreover, dividing the received order into the plurality of sub-orders may be performed by a first entity (e.g., a photo-finishing enterprise) and printing the sub-orders may be performed by a second entity (e.g., a goods/service provider enterprise such as a supermarket, a drugstore, a post office, or an online grocer). Distributing the printed image copies may include delivering a recipient's printed image copies along with an unrelated order of goods/services associated with that recipient.

The order received by the front-end computer system may include a single transaction sequence such as a single charge to a financial instrument (e.g., a credit card, a debit card, electronic funds transfer, a gift certificate, or a coupon) that may be terminated by a click of an "order" button.

In another aspect, a method of facilitating print re-orders includes receiving an order specifying a plurality of recipients and, for each specified recipient, a set of one or more images associated with that recipient The method also may include, for each of the plurality of recipients specified in the received order, printing at least one copy of each image in the recipient's image set and printing a re-order number on a back of each image copy. The re-order number may uniquely identify the image, the recipient of that image, and/or the originator of that image. The method also may include distributing the printed image copies to their respective associated recipients, receiving input (e.g., using an automatic voice or touchtone response system) from a recipient specifying a print re-order number and/or one or more print parameters associated with the print re-order, generating a print of the image associated with the print re-order number, and sending the print to the recipient associated with the print re-order number. Furthermore, the order may include a single transaction sequence such as a single charge to a financial instrument (e.g., a credit card, a debit card, electronic funds transfer, a gift certificate, or a coupon) that may be terminated by a click of an "order" button.

In another aspect, a computer-implemented method of distributing image prints to a plurality of recipients may include receiving, at a facility corresponding to a first entity (e.g., a photo-finishing enterprise), an order specifying a plurality of recipients and, for each specified recipient, a set of one or more images associated with that recipient. The method also may include communicating the received order to a facility corresponding to a second entity (e.g., a goods/service provider enterprise such as a supermarket, a drugstore, a post office, or an online grocer). The method further may include, at the second entity's facility, for each of the plurality of recipients specified in the received order, printing at least one copy of each image in the recipient's image set, and distributing the printed image copies to their respective associated recipients. Distributing the printed image copies may include delivering a recipient's printed image copies along with an unrelated order of goods/services associated with that recipient.

Furthermore, prior to communicating the received order to the facility corresponding to the second entity, the first entity may divide the received order into a plurality of sub-orders so that each sub-order corresponds to a different recipient. Printing may include printing a set of one or more images in each sub-order and/or printing, for each sub-order, a run of prints associated with a specified recipient. Also, a destination identifier that identifies the specified recipient for a corresponding run of prints may be printed. The destination identifier may delimit a corresponding sub-order and/or may include one or more of the following items: a shipping address, a recipient's name, a thumbnail image index, a bar code, a textual message and/or print re-ordering information.

In another aspect, a computer-implemented method of distributing image prints to a plurality of recipients may include receiving an order from a user at a public entry terminal (e.g., a digital drop box, a point-of-sale station, or a kiosk), the order specifying a plurality of recipients and, for each specified recipient, a set of one or more images associated with that recipient. The method also may include transmitting the received order from the public entry terminal to a photo-finishing facility. The method further may include printing, for each of the plurality of recipients specified in the received order, at the photo-finishing facility at least one copy of each image in the recipient's image set and distributing the printed image copies to their respective associated recipients.

Optionally, receiving the order from the user at the public entry terminal may include reading digital images from a computer-readable medium (e.g., a FLASH memory, a writeable CD-ROM or a diskette) provided to the public-entry terminal and/or receiving manual input specifying the plurality of recipients and the set of one or more images associated with each recipient.

In another aspect, a computer-implemented method of ordering image prints for a plurality of recipients may include receiving at a host system an order from a client system, where the order includes a single transaction sequence and specifies a plurality of recipients and, for each specified recipient, a set of one or more images associated with that recipient. The method further may include, at the host system, dividing the received order into a plurality of sub-orders, where each sub-order corresponds to a different recipient. The method also may include printing a set of one or more images in each sub-order and/or printing, for each sub-order, a run of prints associated with a specified recipient. Moreover, the method may include printing a destination identifier that identifies the specified recipient for a corresponding run of prints. The destination identifier may delimit a corresponding sub-order and/or may include one or more of the following items: a shipping address, a recipient's name, a thumbnail image index, a bar code, a textual message and/or print re-ordering information.

Optionally, a first image in a sub-order may have print parameters (e.g., print size, number of copies, print finish, and/or a textual message) that differ from print parameters of a second image in the sub-order. Also, the images in a first recipient's image set may differ from images in a second recipient's image set, and print parameters of a first recipient's image set may differ from printing parameters of a second recipient's image set. Further, the print parameters may differ among images within an image set.

Moreover, dividing the received order into the plurality of sub-orders may include, for each image in the received order, instantiating a copy of the image for each recipient designated to receive a print of that image. An instantiated copy may include a digital image file.

In another aspect, a computer-implement method of processing an order for a physical manifestation of digital content may include receiving an order specifying a plurality of recipients and, for each specified recipient, a set of digital content associated with that recipient. The method also may include dividing the received order into a plurality of sub-orders (each sub-order corresponding to a different recipient) by instantiating a digital copy of the digital content for each recipient designated to receive a physical manifestation of that digital content. The method further may include generating a physical manifestation of the digital content in the recipient's digital content set. The digital content may include a digital image and the physical manifestation may include a photographic print of the digital image.

The method may further include distributing the physical manifestations to their respective associated recipients. Moreover, the receiving and dividing may be performed by a first entity (e.g., a photo-finishing enterprise) and the generating may be performed by a second entity (e.g., a goods/service-provider enterprise). Optionally, receiving, dividing and generating may be performed by a single entity or may be dispersed among two or more different entities. Also, receiving an order may be performed by an enterprise providing a web front-end, and dividing or generating, or both, may be performed by a fulfillment enterprise different than the enterprise providing the web front-end.

One or more of the following advantages may be provided. The systems and techniques described here provide intuitive and convenient mechanisms that allow a user to order prints of images and have the prints distributed to multiple recipients at different locations with a minimum of time, trouble and expense on the part of the ordering user. For example, in a single ordering sequence, a user can specify a set of one or more prints and have them distributed to multiple different recipients. As a result, the user need not reenter redundant information—for example, identifying the images to be printed, supplying payment information, and the like—as otherwise would be required if the print order was limited to a single shipping destination. Moreover, by allowing a user to specify multiple recipients within a single print order, the user is not subjected to a minimum dollar amount for each of several different orders. Rather, because multiple recipients are allowed, the user is better able to satisfy the minimum dollar amount without being forced to order more prints than otherwise would be desired.

In addition, because an order can designate multiple recipients, the user need not incur multiple charges on a credit card or other financial instrument when ordering prints for multiple recipients. Furthermore, by allowing the user to specify different print parameters (e.g., size, number of copies, finish) for each of the individual recipients, flexibility and convenience in the print ordering process are enhanced.

Moreover, users can distribute copies of prints to multiple recipients without having to incur the effort and expense involved in receiving print copies from a photofinisher, sorting the prints into sets according to destinations, putting the prints in protective envelopes, and then re-mailing the sets of prints to their respective recipients. As a result, sets of prints can be distributed to multiple destinations more quickly and with less expense and effort.

In addition, by employing a non-linear workflow model certain benefits and efficiencies are realized. More particularly, by taking a single multiple-recipient order, breaking it down into sub-orders corresponding to a single recipient, selectively instantiating and re-organizing multiple instances of designated images to build each sub-order, and then printing each sub-order as a separate run of prints for the associated recipient, a single print order (transaction sequence) can be used to order prints to be generated and distributed to multiple recipients. Moreover, such a non-linear workflow tends to increase the efficiency and/or speed of the print generation and distribution tasks dramatically.

In another aspect, a method of facilitating photographic print re-ordering includes encoding a photographic print with an identifier identifying a recipient of the photographic print and an originator of the photographic print.

Implementations of the method include one or more of the following. The encoding further comprises embedding one or more error detection characters in the identifier. The characters in the identifier can be checksum values. The checksum values can be generated using a modulo function. Information relating to a recipient of the photographic print, an image portion of the photographic print, and one or more parameters of the photographic print can be included. The parameters can relate to the size of the photographic print, a finish selection for the photographic print, and an imaging operation performed on the photographic print. An offset can be added to the sequence number. A checksum can be generated for the offset sequence number and inserted in a predetermined position in the offset sequence number.

In another aspect, a method of facilitating print re-orders includes receiving an order specifying a plurality of recipients and, for each specified recipient, a set of one or more images associated with that recipient. For each of the plurality of recipients specified in the received order, the method includes printing at least one copy of each image in the recipient's image set and printing a re-order number on back of each image copy, the re-order number having a unique identifier and a sequence number.

In another aspect, a method facilitates photographic print reordering by encoding a photographic print with an identifier identifying a recipient of the photographic print and one or more printing parameters associated with the photographic print.

Implementations of the above aspect may include one or more of the following. The identifier can identify an image from which the print was generated. One or more printing parameters associated with the photographic print can be generated. The print parameters can include one or more of the following: size, finish, and cropping.

In another aspect, a method of facilitating photographic print re-ordering includes: encoding a photographic print with an identifier identifying an originator of the photographic print and one or more printing parameters associated with the photographic print.

In yet another aspect, a method facilitates photographic print re-ordering by encoding a photographic print with an identifier identifying a recipient of the photographic print, an originator of the photographic print, an image from which the photographic print was generated, and one or more printing parameters associated with the photographic print.

In yet another aspect, a method of facilitating photographic print re-ordering includes: receiving an order to send a photographic print of an image to a plurality of recipients; generating a photographic print of the image for each of the plurality of recipients; and encoding each photographic print with a reorder number specific to that prints' intended recipient.

In another aspect, a computer-implemented method personalizes image prints by: receiving an order designating an image and a plurality of recipients to receive a print of the image; printing recipient-specific information on one or more of the image prints; and distributing the image prints to their respective recipients.

The details of one or more embodiments are set forth in the accompanying drawings and in the description below. Other features, objects, and advantages of the invention will become apparent from the description and drawings, and from the claims.

DRAWING DESCRIPTIONS

FIG. 1 is a block diagram showing a typical computer architecture.

FIGS. 2A–2F show a series of typical display windows that a user might encounter when ordering image prints online.

FIG. 3A is a block diagram of a system for making and distributing image prints.

FIG. 4 is a flowchart of distributing image prints to multiple destinations.

FIG. 5 shows an example of a user interface that enables users to designate recipients of image prints.

FIG. 6 is an example of a data table for a distribution alias for distributing image prints.

FIGS. 7A, 7B and 7C show examples of a menu architecture for distributing image prints.

FIG. 8 is a flowchart of image print delivery.

FIG. 9 is an example of a destination identifier print.

FIG. 10B shows a browser window displaying a persistent picture delivery bar.

Like reference numbers and designations in the various drawings indicate like elements.

DETAILED DESCRIPTION

Figure 3B:
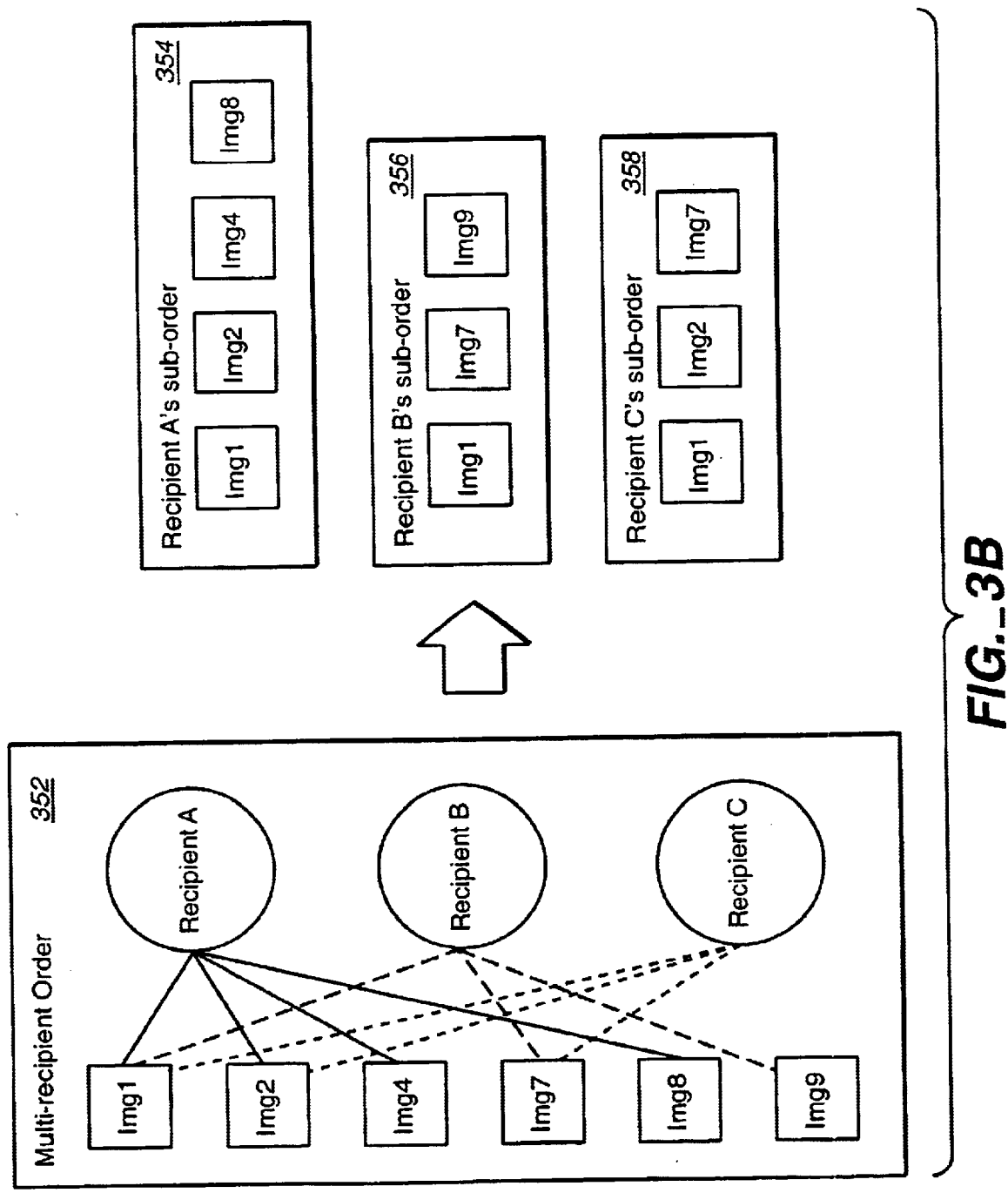
FIG. 3B is a diagram illustrating a non-linear workflow for instantiating multiple instances of images and re-arranging them into sub-orders.

FIG. 3A is a block diagram of one deployment of a print generation and distribution system 300. In general, the system of FIG. 3A enables users to transmit images to a photo-finisher and then order prints of those images to be sent to one or more recipients. In FIG. 3A, one or more customers 302–304 communicate with the system 300 over a wide area network 310 such as the Internet. In one embodiment, the system 300 stores digital images that have been submitted by the customers 302–304 over the Internet for subsequent printing and delivery to designated recipients.

The system 300 has a web front-end computer system 320 that is connected to the network 310. The web front-end computer system 320 receives customer input or requests from the network 310 and communicates the received information to an image archive database 330. The image archive database 330 captures images submitted by the customers 302–304 and archives these images for rapid retrieval when needed. The information stored in the image archive database 330 in turn is provided to a print laboratory system 340 for generating high resolution, high quality photographic prints. The output from the print lab system 340 in turn is provided to a distribution system 350 that delivers the physical prints to the customers 302–304 and/or to their respective designated recipients. Further details on the print generation and distribution system are provided in U.S. patent application Ser. No. 09/428,871, filed Oct. 27, 1999, and entitled "Multi-Tier Data Storage System," which is incorporated by reference.

Although the print lab system 340 and the distribution system 350 are represented as separate boxes in FIG. 3A, in various implementations they can be integrated in whole or in part. For example, the print lab system 340 can be designed to generate prints in a manner and/or in an order that readily facilitates physical shipment of the prints to their respective ultimate destinations. (As used herein, "destination" is used to include a shipping address, for example, a post office address for an enterprise or an individual, and/or a name of a specific individual or group of individuals residing at a given shipping address.) In one implementation, a single print order received at the web front-end 320 could be divided into sub-orders, each of which corresponds to a set of prints to be generated and delivered to a separate destination address and/or intended recipient. Then, for each order, the print lab system 340 could create multiple instances of digital images and rearrange them as needed to build the constituent sub-orders. Each sub-order then is sent to the printing system to generate a separate run of prints for the recipient associated with the sub-order under consideration.

In general, this process of instantiating multiple image instances and re-ordering those instances as appropriate to build sub-orders represents a non-linear workflow model which, among other advantages, enables a user, through a single print order (delimited, for example, by a single transaction sequence and/or a single credit or debit card charge), to specify multiple different recipients, each of whom can receive his or her own personalized set of prints in which each can be generated according to customizable parameters (e.g., size, number of copies, finish, personal message, etc.). In addition, the non-linear workflow can cause a dramatic increase in the efficiency and/or speed with which prints can be generated and distributed to one or more recipients.

FIG. 3B illustrates an example of a non-linear workflow in which sub-orders are generated from a print order specifying multiple recipients. In this example, assume that a user places an order 352 for prints (for example, by creating associations between images and recipients) identifying three different recipients A, B, and C, each of who is to receive a set of prints selected from images 1–10. In this example, assume that Recipient A is to receive prints of Images 1, 2, 4 and 8 (Recipient A's image associations are indicated by solid lines), Recipient B is to receive prints of images 1, 7 and 9 (Recipient B's image associations are indicated by dashed lines) and Recipient C is to receive prints of Images 1, 2 and 7 (Recipient C's image associations are indicated by dotted lines). The images 1, 2, 4, 7, 8, and 9 in print order 352 are then instantiated and re-organized as appropriate to generate, or build, three separate sub-orders 354, 356, 358—one for each of the three different recipients A, B, C, respectively. Each of these sub-orders in turn is sent to the printing system to generate a contiguous run of prints for the associated recipient.

According to this example, Image 1 would be instantiated three times, once for each of the three different print sub-orders 354, 356, and 358 in which it is included (that is, each of Recipients A, B, and C is to receive a print of Image 1). Similarly, Image 2 would be instantiated twice (one instance for Recipient A's sub-order 354 and another instance for Recipient C's sub-order 358), as would Image 7 (one instance for Recipient B's sub-order 356 and another instance for Recipient C's sub-order 358). Each of the remaining images (4, 8 and 9) would be instantiated only once because in each case the image is being printed for, and sent to, only a single recipient (equivalently, is part of a single sub-order). As the images are instantiated according to the various sub-orders for which they are required, the image instances are inserted into a sub-order sequence, which when completely built, can be sent to the printer to generate a corresponding run of prints.

In one implementation, a sub-order requires only a single instance of each image to be printed even if multiple copies (and/or prints of varying sizes and/or finishes) of the image are to be printed. This is because the printer can be instructed by a control system to print multiple copies of a single image on an individual image basis. Alternatively, if the system designer found it desirable to do so, a sub-order could include multiple instances of an image, one instance for each different copy of that image to be printed. Although this generally would result in larger sub-orders that required more memory and/or storage space, it could potentially simplify the print generation control process.

Typically each run of prints (corresponding to a separate sub-order) is preceded (or followed) by a destination identifier, for example, a print that includes the name and address of the intended recipient for the run under consideration. This destination identifier separates adjacent runs and provides a convenient delimiter and/or address label to allow the distribution system 350 to package up runs of prints quickly and efficiently and to initiate delivery of them to their respective intended recipients.

FIG. 4 is a flowchart of a process that allows a user to transmit images to a photo-finisher and then order prints of those images to be sent to one or more recipients. In general, the print generation and multi-recipient distribution process of FIG. 4 is oriented to an image, or set of images, of which a user desires to distribute prints to a group of one or more recipients. That is, a user's print order is delimited by a set of images selected by the user and not by the number or location of recipients to receive the prints.

Before the user can order prints, the user's images first are transmitted to the photo-finisher (step 400). Such transmission of images can be accomplished in any of several different manners. For example, if the images have been generated with a digital camera or any of various computer software (e.g., a graphics program such as Adobe Photoshop) or hardware devices (e.g., scanner), then the user has the option of transmitting the digital image files to the photofinisher's host computer, for example, over a computer network such as the Internet. Any available protocol (FTP, HTTP, etc.) or electronic communication application (e.g., e-mail, special-purpose software provided by the photo-finisher) could be used for this purpose.

Alternatively, the digital images first could be stored on a physical storage medium (a floppy disk, a read/write CD-ROM, a Flash memory chip, etc.) and then sent to the photo-finisher's place of business by U.S. mail, overnight courier or local delivery service. The photo-finisher then could read the images from the storage medium and return it to the user, potentially in the same package as the user's print order. In addition, the photo-finisher could load data or programs for the user's benefit onto the storage medium before returning it to the user. For example, the photo-finisher could load the storage medium with image viewing or editing software to allow the user to better manage images. The photo-finisher also could load calibration or control data onto the storage medium, which the user could load onto his or her computer to be able to view the images, or print them on a local printer, with improved color accuracy. Alternatively, or in addition, if the storage medium was, for example, a FLASH memory chip of the type used in certain models of digital cameras chip (e.g., SmartMedia™ or CompactFlash™), then the photo-finisher could load control data or driver programs in FLASH memory that, when loaded into the digital camera, would modify its behavior, for example, to enhance color accuracy or other performance characteristics. Typically, using FLASH memory in this manner to modify digital camera behavior would require cooperation from, and/or a business arrangement with, one or more digital camera manufacturers.

If the images originate from physical photographic media (e.g., exposed film, previously processed negatives, prints), then the user could send the desired items to the photo-finisher, which would, for example, develop the exposed film and scan the resulting prints or negatives to produce corresponding digital image files. The capability to handle physical photographic media enables, for example, a user to send a collection of old prints and/or negatives to the photo-finisher, which could then scan the photographic media to generate digital images.

Another alternative for transmitting a user's images to the photo-finisher involves the use of a public entry terminal (also referred to variously as a "digital drop-box," a "point-of-sale (POS) station" and/or a "kiosk"). A public entry, terminal essentially is a special-purpose computer system that is made publicly available (e.g., in a shopping mall, video arcade, supermarket, drug store, post office, etc.) and which is designed to capture users' image data. The public entry terminal typically would be in communication with the photofinisher's host system, for example, over the Internet, a virtual private network or dedicated telephone line, and could transmit images captured from users to the photofinisher's facility to have prints made.

For example, a public entry terminal placed at a drug store could have a slot that accepts removable storage media, such as a FLASH memory chip, and reads image files from an inserted storage medium. Alternatively, or in addition, the public terminal could include one or more data ports (e.g., a USB or SCSI port) through which users could upload images to the public terminal directly from their digital cameras. The uploaded image files could be displayed on a monitor to the user, who could then select images of which prints are desired, specify print parameters, and designate recipients for the prints. In addition, the public entry terminal could include application software or utilities that allow users to edit images as desired, for example, to resize or crop images, to change an image's orientation, to remove redeye, to modified the color characteristics, etc. In any event, after the user had uploaded his or her images and has specified the images to be printed and the intended recipients, the public entry terminal could formulate a corresponding order and forward it on the photo-finisher's host system to initiate fulfillment.

Such a public terminal also could include a scanner for creating digital image files by scanning a user's prints or negatives. After the digital image files had been generated, the user could proceed to view, manipulate and/or order prints in the manners described above. The public entry terminal potentially also could support various electronic payment and authorization mechanisms, for example, a credit or debit card reader in communication with a payment authorization center, to enable users to be charged, and pay for, their prints at the time of ordering.

However they are transmitted, after the photo-finisher is in possession of the user's digital images, the photo-finisher can make them available to the user online, for example, by hosting the images on a web page at which the user can view and access the images using a browser application (step 402). As described in more detail below, the user accesses the photo-finisher's website to designate which of the images should be printed, parameters relating to printing (e.g., finish, size, number of copies), and one or more recipients to whom the prints are to be sent.

In addition to hosting the user's images on a web page, the photo-finisher also can store the images in an archive (e.g., a database management system (DBMS)) so that the user, and/or others given authorization by the user, can access them at any time in the future. Such access might be desired to order additional prints or simply to be able to share an online photo album among specified users. With regard to the former (ordering additional prints), each print could be encoded on its back or front with a print re-order number that uniquely identifies the print, the image used to create the print, the particular recipient of the print, and/or the originator of the print/image. Such a print re-order number could be used by a print recipient to order additional copies of the print, for example, over the Internet by visiting a URL specified on the received print. As another example, by maintaining an automatic voice and/or touchtone response system at the photofinisher's facility, a print recipient could call a toll-free telephone number (also potentially printed on the print) associated with the automatic response system and punch in (or speak) the unique re-order number for the print of which an additional copy is desired. Optionally, the user also could key in appropriate information using the telephone keypad to specify parameters for the re-ordered print or image (e.g., size, number of copies, finish). If no such optional parameters were entered by the recipient, a default condition could be to use the parameters of the original print copy received by that recipient. In any event, the automatic response system could use the entered unique re-order number to generate an order for the particular print identified by the re-order number and then have the print delivered to the recipient identified by the re-order number.

With regard to access to an online photo album, such a historical image archive would provide a valuable asset to users because, unlike some other data types, the value of image data generally increases with time. In addition, maintaining an online archive of a user's images allows the user to access the images regardless of the user's location, and frees the user from having to use lots of disk space or other storage capacity to store the images locally.

After the user's images have reached the photo-finisher and have been made available online, the user can place an order with the photo-finisher (step 404). One way to place an order is by having the user view the images online, for example, with a browser and selectively designate which images should be printed. The user also will specify one or more recipients to whom prints should be distributed and, further, print parameters for each of the individual recipients, for example, not only parameters such as the size, number of copies and print finish, but potentially also custom messages to be printed on the back or front of a print. As used herein, the term "print" refers to any physical manifestation, or process for generating a physical manifestation, of graphical information. This includes of course photographic prints, but also any other item to which graphical information can be imparted, for example, greeting or holiday cards, books, calendars, playing cards, T-shirts, coffee mugs, mouse pads, key-chains, or any other type of gift or novelty item.

After the prints, recipients and respective parameters have been specified, the user's order is fulfilled by making prints of the designated images and distributing them to the specified recipients (step 406). In general, fulfillment can be accomplished either by the photo-finisher itself or by another entity or company in cooperation with the photo-finisher. Potentially, the photo-finisher could have business arrangements with two or more different fulfillment companies, which could be dispersed geographically (at various locations around the country or world) to minimize shipping costs, labor costs and/or delivery time. Alternatively, or in addition, different fulfillment companies could be used which have different areas of expertise or production ability. For example, one fulfillment company could specialize in making standard photographic prints, another fulfillment company could specialize in printing greeting cards, yet another fulfillment company could specialize in generating T-shirts, and so on.

Distribution and delivery of the prints to recipients could be accomplished by any of various techniques. For example, standard U.S. Mail or courier services (e.g., Federal Express or UPS) could be employed. Alternatively, the photo-finisher could have a business arrangement with various other service or delivery companies to deliver print orders along with other regularly scheduled deliveries. For example, the photo-finisher could have a business arrangement with a delivery or service company (e.g., Webvan, an online grocer in the San Francisco Bay area, or Streamline, Inc., a goods/services/convenience portal head-quartered in the Boston area) in which the prints for a particular recipient would be generated on the delivery/service company's premises and then delivered along with that recipient's order.

FIG. 5 shows an exemplary graphical user interface (GUI) based environment that employs iconographic aliases (graphical representations of distribution groups) and graphical input techniques to enable a user to designate intended recipients of digital images and/or prints of the digital images. In the example shown in FIG. 5, the user, Jane Smith, has accessed her most recently uploaded images by entering into the browser's Address field 520 a uniform resource locator (URL) address 521 provided to her by the photo-finisher and corresponding to a web page at which her most recent images are hosted. In response, the browser window 501 accesses the specified address and displays its contents, namely, a greeting message 522, twelve images 508–519 recently uploaded by Jane, a link 523 to an archive that includes all of Jane's uploaded images, photo albums 524–526 representing collections of related images as grouped by Jane, and a picture delivery bar 500.

The picture delivery bar 500 includes one or more iconographic distribution aliases 502–507, each of which represents a distribution group of one or more recipients. The recipients specified in a distribution group may or may not have overlapping members in common with other distribution groups. For example, a member of the user's Friends distribution alias 504 may include one or more recipients who also are members of that user's Basketball Team distribution alias 506 or Co-workers distribution alias 505. In general, no limitations exist on the number or identities of members in a particular distribution alias.

A user of the GUI in FIG. 5 can indicate intended recipients of prints (or other objects bearing images) by associating one or more of the digital images 508–519 and/or one or more of the albums 524–526 with the icon for a desired distribution alias. One way that a user can specify such an association is by dragging and dropping a digital image (or album) onto a desired iconographic distribution alias 502–507. Virtually any graphic or non-graphic input techniques can be used to associate a digital image with an iconographic distribution alias. For example, various keystrokes or key sequences could be used to designate digital images and distribution aliases and to specify associations there between. Alternatively, or in addition, graphic input techniques other than dragging and dropping (e.g., pointing, clicking, menu selection, etc.) could be used to associate specified digital images with iconographic distribution aliases.

In the example shown in FIG. 5, seven different iconographic aliases 502–507 are presented to the user. The particular iconographic aliases displayed, and the group of recipients represented by each alias, can be designated and modified by the user and/or can be specified by a system administrator or other third party. Each alias can have a different graphical symbol, and/or a different alphanumeric identifier, potentially representative of the distribution group to which it corresponds. For example, the icon used for the Family alias 502 is labeled "Family" and depicts a picture of five family members. In contrast, the icon for the Book Group alias 506 is labeled "Book Group" and depicts a picture of a book.

A user can create a new alias, or modify an existing one, using a separate window or interface element (e.g., a "Create/Modify Alias window," not shown) dedicated to that purpose. Such a Create/Modify Alias window could enable the user to specify parameters associated with each distribution alias, for example, the alias' name, its icon or other graphic symbol, the identities of and contact information for each of the alias' members, and various preferences (delivery options, etc.) associated either with the distribution alias as a whole and/or or with the alias' individual members.

The appearance and functionality of the Picture Delivery Bar 500 can be varied in a virtually unlimited number of ways depending on the preferences of the system designer and/or the user. For example, the distribution aliases 502–507 could be presented and treated as standalone entities and need not be displayed within a dedicated area such as Bar 500. Moreover, different or additional graphical symbols could be used as iconographic icons. For example, a thumbnail representation of a digital image provided by the user (e.g., a picture of the user's family) could be used as the graphic symbol for the Family alias 502. In addition, features such as animated icons (which display a time-series of related images) or audible icons (which play a predefined noise, sound or word upon being activated by the cursor) could be used to represent distribution aliases.

As shown in FIG. 5, any combination of the digital images 508–519 and/or albums 524–526 can be associated with any or all of the iconographic distribution aliases 502–507. For example, digital images 509, 511, 513, and 516–518 can be dragged and dropped onto, or otherwise associated with the Family distribution alias 502. Images can be associated with aliases either one at a time or as a group of images simultaneously. For example, a user could select image 516, image 517 and image 518 and then could drag all three of the selected items at the same time onto one of the distribution aliases 502–507. Effectively the same result could be achieved by selecting and dragging each of these three digital images 516, 517, 518 separately onto the distribution alias in three successive operations.

The effect of associating one or more digital images with one or more distribution aliases is to identify the intended recipient or recipients for the designated images and/or prints. Each association sequence could be processed dynamically as the association is made (i.e., delivery of the designated image and/or print could be initiated immediately as soon as an image-alias association was established) or one or more associations could be placed in a queue and later processed in batches. A user could indicate that such batch processing is to be initiated, for example, by clicking on the Process button 516 on the Picture Delivery Bar 500.

Alternatively, or in addition, the user can associate other images not displayed within the browser window 501 (for example, images stored locally on the user's computer or stored remotely at other computers) with one or more of the distribution aliases 502–507. For example, a user could drag and drop an image file from a directory in the user's disk drive, and/or an image from another web page displayed in a different browser window instance, onto a distribution alias. In that case, such dragging and dropping would have two separate purposes: not only would it create an image-alias association, but also it would initiate a transmission of the image in question to the photo-finisher's print generation and distribution system.

Whether processed immediately or queued up and processed in batches, the establishment of an image-alias association indicates that the user who established the association desires that a print of the designated digital image, or an electronic copy of the digital image, or both, be sent to the recipients represented by the selected distribution alias. To accomplish the latter distribution task (transmitting the designated digital image to the designated recipients), any of various electronic communications techniques could be employed. For example, the digital image could be attached to an e-mail message and sent to each of the recipients automatically (i.e., without further involvement by the sending user). Alternatively, special purpose communication software could be employed to transmit the designated digital image to the specified recipients. For example, a utility similar to an "Instant Messaging" application could be used to push a copy of the digital image to the recipient and cause software executing on the recipient's computer to generate a pop-up display of the digital image that appears automatically on the recipient's computer screen, potentially along with a message such as "A print of this image will be sent to you courtesy of <sender's name>."

To accomplish the former distribution task (sending prints of the digital image to the specified recipients), the image-alias association(s) specified by the user could be used to generate orders that are sent to a fulfillment enterprise that would be responsible for generating a print of the image and shipping a copy to each of the recipients represented by the selected distribution alias. The fulfillment enterprise either could be associated with a company that takes orders for image prints, or the fulfillment enterprise could be implemented as one or more independent organizations. As an example, the fulfillment enterprise could be a production facility that produces photographic prints from digital images and then sends the prints (using, for example, a postal or courier service) to the specified recipients. In this example, the front-end image ordering software would transmit electronically to the fulfillment enterprise various information, e.g., identifying the digital images to be printed, parameters for each digital print to be made (e.g., size, finish, number of copies, personal message, etc.), address information for each of the recipients, payment information, and the like, and then the fulfillment enterprise would utilize this information in fulfilling the order.

The information used to fulfill an order could be collected from the user in the first instance and maintained in a data repository located either at the user's client system or at a remote server on a computer network available to the user's client system and/or to the fulfillment enterprise. Each distribution alias potentially would have its own associated data table.

The GUI of FIG. 5 represents only one of several alternative mechanisms or interfaces through which users could designate intended recipients of prints. For example, a standard address book metaphor, such as found in certain e-mail applications or personal information manager (PIM) programs, could be used to designate recipients. To do so, the user would select one or more recipients from among the user's address book entries and then specify which images should be printed and distributed to that user or those users. Or the process could proceed in the opposite order—the user could first specify images to be printed and then select one or more recipients from the user's address book. Alternatively, or in addition, the user could simply type in the contact information, for example, using a text entry form or command-line interface, to designate print recipients. Virtually any other mechanism or technique for identifying recipients could be used instead or in addition. For example, the user could access one of the several directory services available on the Internet (e.g., Bigfoot at http://www.bigfoot.com) to locate, identify and/or select print recipients.

FIG. 6 shows an example of a data table that could be used to store information relating to a particular distribution alias. As shown therein, the data table 600 in this example corresponds to the user's "Family" distribution alias, and includes six entries or rows 602, one for each of the members 504 of the distribution alias. The data table 600 can include multiple columns 606–612 in which information about each of the members 604 is stored. For example, the data table 600 can include columns for contact information 606 (shipping address, e-mail address, telephone number, etc.), default information (e.g., preferred print size, finish, number of copies, whether digital and physical copies of the image, or both, should be delivered, etc.), and delivery options 610 (e.g., Federal Express, customer pickup, U.S. Postal service, etc.). In addition, the data table 600 can store virtually any other items of information that may be relevant to the print delivery services, for example, personal messages that should be delivered along with the digital image or the physical print or both. Moreover, additional data relating to the distribution alias as a whole (e.g., name, graphic symbol to be used, other functional or aesthetic data, user's payment mechanism, etc.) could be stored along with, or separately from, the data table shown in FIG. 6.

FIGS. 7A–7C show an example of a menu architecture that could be implemented to make the information in the data tables of FIG. 6 visible and/or accessible to the user. The user could navigate this menu hierarchy in order to inspect and/or modify the current settings of the various options and parameters associated with the selected distribution alias and/or with one or more of the alias' individual members. In this manner, the user either could rely on the current settings for distribution or the user could modify the settings on the fly to reflect the user's preferences for a particular order and/or for a specific user.

As shown in FIG. 7A, the menu can be implemented as a series of hierarchical pop-ups menus that appear in succession when the user drags a digital image 700 onto a distribution alias icon 702 and then proceeds to navigate through the various levels of menus. Each successive level of the four menu levels (704, 712, 718, 721) can include multiple entries, each of which potentially can expand into a lower level menu displaying further entries. The presence of an arrow (e.g., 711, 716 or 720) next to a menu entry means that a lower menu level is available for that entry. A black arrow indicates that the arrow was selected by the user (e.g., by placing the cursor on it or by manipulating the directional arrow keys on the keyboard) to display the next lower menu level for the entry under consideration. A white arrow in contrast indicates that the arrow was not selected.

In the example shown in FIG. 7A, the main menu level 704, which pops up when the image 700 is dragged onto icon 702, lists the members of the distribution alias—that is, the names (or other identifiers) of the six recipients 705–710 represented by the Family distribution alias 702. Each entry in the main menu 704 can have one or more lower menu levels of corresponding information or parameters, which can be accessed by placing the cursor on top of the arrow at the right-hand side of the main menu entry of interest. For example, a secondary menu level 712 for the Brother entry 709 is presented when the user places the cursor on arrow 711. Accordingly, FIG. 7A shows a state of the GUI in which, following placement of image 700 on icon 702, the user has navigated through the menu hierarchy by selecting the arrow 711 next to the "Brother" entry 709 in main menu level 704, then selecting the arrow 716 next to the "Send To" entry 713 of menu level 712, and then finally selecting the arrow 720 next to the "Delivery Options" entry 719 in the menu level 718.

In this example, the secondary menu level 712 includes three entries: Send To 713, Defaults 714 (discussed below with reference to FIG. 7B) and Message 715 (discussed below with reference to FIG. 7C). When the user selects the arrow 716 next to the Send To entry 713, the current shipping address and other contact information for the user's brother (i.e., the distribution alias member 709 from which sub-menu levels 712 and 718 arose) is displayed in, text box 717. At this point, the user either can inspect the contact information to ensure that it is correct or the user can use standard cursor and text entry techniques to modify the contact information directly within the text box 717.

Next, the user has selected the arrow 720 next to the Delivery Options entry 719, which in turn brings up menu level 721 showing five different options 722–726 for delivery of the image print copies that were ordered by the user. As shown in FIG. 7A, the current setting is to deliver the order by Federal Express. The user either can leave the Delivery Option setting as is, or the user can change the Delivery Option to the desired choice, for example, by clicking the corresponding radio button next to the desired option.

FIG. 7B shows an alternative path that a user could take in navigating the menu hierarchy of FIG. 7A. Specifically, as in FIG. 7A, the user in FIG. 7B has selected arrow 711 next to the Brother entry 709, but then the user selected the arrow 729 next to the "Defaults" entry 714 in menu level 712, thereby bringing up another menu level 730 showing the various defaults associated with copies of images to be sent to the user's brother. Menu level 730 includes four different entries, the first three (731–733) specifying attributes of the physical image copies that are to be sent to the user's brother. Based on the current setting shown in FIG. 7B, the user's brother will receive two 5"×7" glossy prints of each designated image. The user can modify any of these attributes as desired directly within the menu level 730 by using standard cursor manipulation and text entry techniques.

Menu level 730 also includes an "Options" entry 734, which presents the user with further options relating to the physical print copies that will be sent to the user's brother. Specifically, menu level 736 displays that currently the user's brother will not receive an thumbnail image index (option 737), the print copies received will not be in an album (option 738), and the print copies will not be framed (option 739). As before, the user can modify any or all of these options as desired directly within the menu level 736.

FIG. 7C shows another alternative path that a user could take in navigating the menu hierarchy. In this example, the user has chosen to inspect the Message 741 that will accompany the object copies (digital or physical or both) sent to the user's brother. The user either can use this default message by leaving it unmodified, or the user can choose to send a different message by editing the text in message box 741.

FIGS. 7A–7C illustrate one potential implementation for the menu architecture. However, virtually any other menu architecture could be employed depending on the preferences of the system designer or the user, or both. In particular, the number of menu levels and the information made available by each menu level are design choices that likely will vary with the particular application. In addition, the GUI could be implemented such that a user can specify or alter the particular menus presented and their respective informational content.

FIG. 8 is a flowchart of a process for designating recipients of image print copies and delivering the copies to the designated recipients. In general, the steps of designating recipients and specifying images to be printed can be performed in any order. For example, the recipients can be designated first and then the images to be printed can be specified, or vice versa. Moreover, these steps can be repeated and interleaved as desired in a single print ordering sequence.

Furthermore, a print ordering sequence need not use distribution aliases or graphical association techniques, but rather can employ any other mechanisms or tools for specifying recipients and images to be printed. Accordingly, the process depicted in FIG. 8 illustrates merely one example of a typical print ordering sequence. Virtually any other sequence or order of steps that achieve substantially the same or a sufficiently similar result could be used instead.

In the example shown in FIG. 8, the user may specify one or more desired distribution aliases and/or individual recipients (step 800). The user can accomplish this task using a dedicated window or interface element that, at a minimum, allows the user to create a new alias and specify members of that alias and their respective contact information. Alternatively, a third party such as the user's employer can specify one or more distribution aliases (e.g., "Legal Dept.", "Administrative Staff", "Project X Team") that can be made available to the user.

Next, the distribution aliases are presented as icons, or otherwise made available, to the user in a GUI environment (step 802). The user then associates one or more digital images and/or albums with a selected distribution alias, for example, by dragging and dropping the digital image(s) onto the icon for that alias (step 804). Optionally, the user can navigate through a menu hierarchy to inspect and/or modify various parameters and options for the distribution alias as a whole, and/or for any of the distribution alias' individual members (step 806).

After the user has associated one or more images with a desired distribution alias, the associations and any other ordering information (e.g., such as would be stored in the data table of FIG. 6 and/or displayed in the menu hierarchy of FIGS. 7A–7C) are used to generate an order (step 808).

The order thus generated will specify that each member of the designated distribution alias is to receive prints of the images designated by the user. Moreover, because each distribution alias has an associated data table that can maintain preferences and options separately for each of the alias' members, each member of the alias potentially can receive different variations and combinations of prints. For example, one member of the distribution alias (e.g., Mom) could receive three 4"×6" matte finish copies of each print along with a thumbnail image index showing thumbnails of all of the images in the order. A different member of the distribution alias (e.g., Grandma) would nominally receive prints of the same images but, depending on her preferences, could receive only a single 8"×10" glossy copy of each print arranged in a photo album. In the same vein, a third member of the distribution alias (e.g., Sister) could receive two 5"×7" matte copies of each print, unframed, plus a single 8"×10" glossy copy of each print in a frame. In addition, each member of the alias potentially could receive a different personal message from the user who ordered the prints and could receive their respective orders via different delivery mechanisms. In general, virtually any number of different options could be applied to each individual member's print order.

After the order has been generated, it is communicated to the fulfillment enterprise to be filled (step 810). In general, the fulfillment enterprise will produce the numbers and types of prints specified by the various alias member's preferences, and distribute the resulting prints accordingly, takings into account the member's respective delivery option preferences. In addition, the fulfillment enterprise optionally can send digital copies of the images (e.g., by e-mail) to each specified recipient.

In one embodiment, the fulfillment enterprise fulfills the print orders by printing, generally in succession, a "run" of prints for each intended recipient (i.e., prints of the images designated for that user). Each run—that is, each batch of prints destined for a different recipient—is separated from adjacent runs by a destination identifier that can be generated by the same equipment and processes as the actual image prints. FIG. 9 shows an example of a destination identifier 900 that includes several items of information including a message 902, potentially including text specified by the user who ordered the prints (Jane Smith); a thumbnail image index 903 including thumbnail images 509, 511, 513, and 516–518 corresponding to the prints sent to this recipient (Joe Smith); reordering information 908; a bar code 910 (encoding, for example, shipping or billing information and/or manufacturing process information used to maintain quality control during print generation); and an address field 904 displaying the recipient's address.

In one embodiment, the address field 904 is printed in a specified size and at a specified location so that it will be visible through a windowed envelope. Accordingly, the address field 904 not only serves as an identifier that can be used by the fulfillment enterprise for processing and handling this recipient's prints, but it also serves as the address label used by the shipper or courier for delivering the prints. In other embodiments, the destination identifier 900 can include virtually any other items of information that might prove useful to the recipient, the fulfillment enterprise, and/or the delivery service.

Figure 10A:
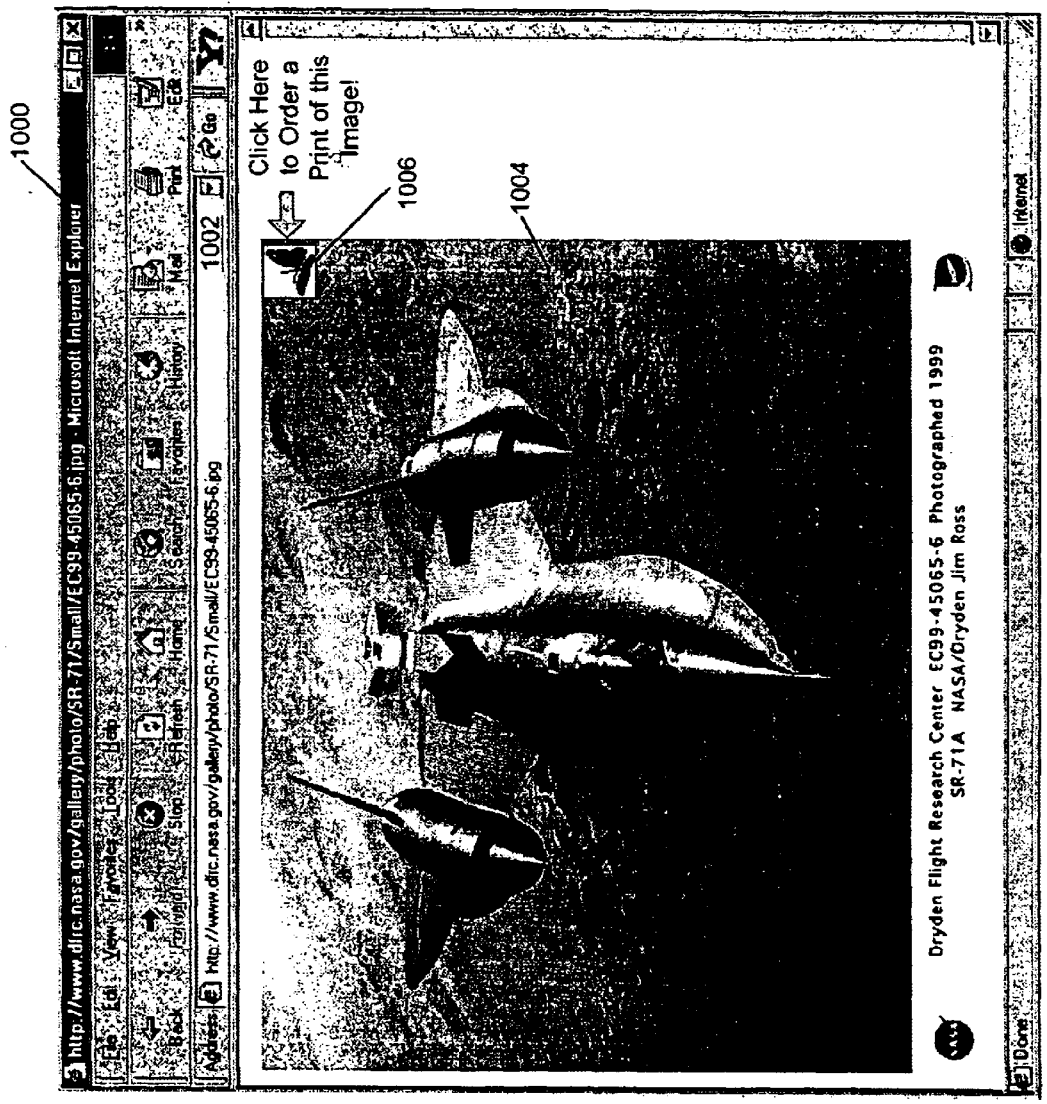
FIG. 10A shows a browser window displaying an image having a print order icon.

The techniques, methods, and systems described here may find applicability in any computing or processing environment in which users desire to order physical manifestations (e.g., prints) of digital content and have them distributed to one or more intended recipients. For example, these techniques and systems could be employed to generate hard copies of virtually any image or other graphical content available on the Internet. In one possible implementation shown in FIG. 10A, a user viewing an image 1004 at URL 1002, could order a print of the image 1004 simply by clicking on an icon 1006 for that purpose. Optionally, the ordering user could specify custom or personalized information pertaining to the recipient of the print—for example, a personal message for the recipient could be specified.

Such a print order could be fulfilled in any of several different manners. For example, the icon 1006 could be implemented as a link that redirects the user to the photo-finisher's website at which the print order could be completed with further input from the user (e.g., print size and finish, number of copies, recipients, billing information, customization or personalization information relating to the recipient, etc.). Alternatively, if for example the user had a standing account with the photo-finisher (for example, specifying default information for print size and finish, number of copies, recipients, billing information, etc.), a single click by the user on the icon could cause the print order to be fulfilled automatically and without further user input or involvement.

FIG. 10B shows an alternative implementation in which a picture delivery bar 1010 is displayed persistently on the user's desktop 1008. Alternatively, the picture delivery bar 1010 could be displayed persistently as a toolbar that effectively is a component of each browser window instance, for example, directly below the address toolbar 1003. In either case, prints could be ordered of digital images stored at any source, for example, at the user's local computer or, as in FIG. 10B, from an arbitrary web page on the Internet controlled by independent entities (NASA, in the example shown), by dragging and dropping the image onto the desired distribution alias. In this example, the icon 1006 does not serve as a clickable link for redirecting the user to the photo-finisher's website, but rather serves as a handle by which the user can "grab" the image and drag it on to the desired distribution alias (in this example, the Parents alias 1012).

To facilitate the print generation process in the example of FIG. 10B, the photo-finisher could have a business arrangement with the independent content provider (e.g., NASA) to have copies of some or all of the content provider's images stored in a manner easily accessible to the photo-finisher (e.g., a RAID (Redundant Arrays of Inexpensive Disks) storage system connected to the photo-finisher's computer network). Such an arrangement would minimize the occurrence of image data being transmitted from the independent contract provider to the photo-finisher with each new print order and thus, for example, would speed up the print re-ordering process. In addition, the photo-finisher could store on its RAID storage system a high-resolution version of the image from which prints would be made while the independent content provider would need only to maintain lower resolution versions for online display to, and selection by, users.

In addition, the systems and techniques described here are not limited to the user's own digital or photographic prints and images but rather may be applied to virtually any media from any source, and in any situation in which users desire to obtain physical manifestations of electronic content. For example, a professional photographer, who had taken pictures of a recent event (e.g., a rock concert), could display the images on a website thereby allowing interested users to view the images and selectively order reprints for one or more recipients.

As another example, a travel company could use these physical content generation and distribution techniques to allow users to choose in an online environment various travel-related digital content (e.g., maps, pictures, itineraries, articles, lists of hotels and restaurants, etc.). Then, the specified digital content could be used to generate a personalized travel book, providing information targeted for the user's upcoming journey.

Similarly, these techniques could be applied to allow users to choose or develop a holiday (e.g., Christmas) card design online (including images and other graphics, personalized text, personalized signatures, and/or any type of computer-generated content) and then have physical copies of that design produced (i.e., actual paper-and-ink Christmas cards) and distributed automatically to everyone on the user's Christmas card list. This same concept could be applied to enable users to design physical post cards, wedding or party invitations, thank you cards, and the like produced and distributed. In the same vein, businesses could use these techniques to design targeted mailings (sets of targeted coupons, an advertisement made up of selected text and graphic components, etc.) and have them produced and distributed to specified recipients.

To facilitate reordering of prints, annotations can be encoded on the back of the photographic print. These annotations can include identification information, as well as messages to the recipients. Moreover, a reorder number can be printed on the back of each picture printed. The reorder number has two parts: a user identification (UID) encoding of a user who ordered the print and a sequence number unique to the user. The UID encoding can also be extended to encode the following information:

Recipient of the print;

Particular image on the print; and

Print parameters such as:
  print size (e.g. 4×6, 5×7, 8×10)
  print finish (e.g. MATTE, GLOSSY)
  any image operation on the print (cropping, rotation).

The UID represents a unique value associated with each print recipient and can include one or more checksum values to ensure the validity of the UID. In one embodiment, the UID encoding value occupies twelve bytes. Checksum values help protect against the possibility of corrupt UID content that is generated during the transmission of the UID over a network. It is therefore desirable to utilize the appropriate safeguards. Such safeguards usually take the form of a number of redundant check bits as some function of the user identification encoding value. The checksum gives a recipient a good indication of whether the data have arrived intact. Appending the data to be transmitted with this "signature", and causing the recipient of a transmission to generate its own version of the data signature, using exactly the same generation algorithm, allows the recipient to detect corrupted data (indicated by mismatched signatures). Error correction can then be achieved by requesting retransmission of the corrupted data packet.

In one embodiment, an "n-bit Checksum" is used to generate the n-bit checksum for the characters associated with the UID. The checksum function computes the sum of the ASCII values of all of the characters within the string. Although checksums are used to perform error detection, other methods such as Cyclic Redundancy Checks (CRC) can be used.

Since the UID will be given to a recipient with a particular print, a simple incrementing of the UID for each additional print, if not protected against, could allow the possibility where the recipient can predict the reprint request number and order, without authorization, the next image in the sequence of pictures, even if the originator did not want that recipient to have a print of the next image in the sequence. To provide privacy and security, and to help prevent this possibility, the sequence number is appended to the UID so that the reorder number for the each print in the series is significantly different from the prior print.

In one embodiment, the sequence number has a maximum of 8 digits that encode the parameters discussed above. For this embodiment, the process starts with an eight digits sequence number and adds an offset such as 1357. The process then computes two checksums. To illustrate, if the sequence value is ABCDEFGH, the first checksum is computed as X=(ABCDEFGH mod 5)+5, while the second checksum Y is computed as Y=(ABCDEFGH mod 7)+3. The "mod" function returns a remainder when two numbers are divided. For example: 20 MOD 8 is 4 because 8 can go into 20 twice (for a total of 16, which is 4 less than 20). The remaining number after two numbers are divided evenly is what the mod function return as a result. After computing the checksums, X is placed as the fifth digit and Y is placed as the eighth digit to come up with a ten-digit unique number ABCDXEFYGH.

To further illustrate, applying the above implementation to input sequence values 1 to 7 will give the following:

1—813358
2—913459
3—513560
4—613661
5—713762
6—813863
7—913964

In this manner, the print request number is encoded in such a way that the number for the next print cannot be easily determined. Thus, the technique provides privacy and security for the user while not unduly limiting the user's ability to share specific photographs with specific third party or parties.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage deices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer 108 as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits).

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

What is claimed is:

1. A method of facilitating photographic print re-ordering, the method comprising encoding a plurality of photographic prints with identifiers, each identifier being unique to one of the photographic prints and identifying a recipient of the photographic print, properties of the photographic print, and an originator of the photographic print, wherein the encoding further comprises embedding one or more error detection characters in the identifier.

2. A method of facilitating photographic print re-ordering, the method comprising encoding a plurality of photographic prints with identifiers, each identifier being unique to one of the photographic prints and identifying a recipient of the photographic print, properties of the photographic print, and an originator of the photographic print, wherein the encoding further comprises embedding one or more checksum values in the identifier.

3. The method of claimed 2, wherein the checksum applies a modulo function to the identifier.

4. A method of facilitating photographic print re-ordering, the method comprising encoding a plurality of photographic prints with identifiers, each identifier being unique to one of the photographic prints and identifying a recipient of the photographic print, properties of the photographic print, and an originator of the photographic print, further comprising adding an offset to a sequence number.

5. The method of claim 4, further comprising generating a checksum for the offset to the sequence number.

6. The method of claim 5, further comprising inserting the checksum in a predetermined position in the offset sequence number.

7. A method of facilitating photographic print re-ordering, the method comprising encoding a plurality of photographic prints with identifiers, each identifier being unique to one of the photographic prints and identifying a recipient of the photographic print, properties of the photographic print, and an originator of the photographic print, further comprising:
   a. generating a first checksum for the offset sequence number;
   b. inserting the first checksum in a predetermined position in the offset sequence number;
   c. generating a second checksum for the offset sequence number; and
   d. inserting the second checksum in a second predetermined position in the offset sequence number.

8. A method of facilitating print re-orders, the method comprising:
   receiving an order specifying a plurality of recipients and, for each specified recipient, a set of one or more images associated with that recipient; and
   for each of the plurality of recipients specified in the received order, printing a plurality copies of images in the recipient's image set and printing a re-order number on back of each image copy, the the re-order number having an identifier unique to the image copy and specifying properties of the image copy.

9. The method of claim 8, further comprising embedding one or more error detection characters in the identifier.

10. The method of claim 8, further comprising embedding one or more checksum values in the identifier.

11. The method of claim 10, wherein the checksum applies a modulo function to the identifier.

12. The method of claim 8, further comprising including information relating to a recipient of the photographic print.

13. The method of claim 8, further comprising including information relating to an image portion of the photographic print.

14. The method of claim 8, further comprising including information relating to one or more parameters of the photographic print.

15. The method of claim 14, wherein one of the parameters relates to the size of the photographic print.

16. The method of claim 14, wherein one of the parameters relates to a finish selection for the photographic print.

17. The method of claim 14, wherein one of the parameters relates to an imaging operation performed on the photographic print.

18. The method of claim 8, further comprising adding an offset to the sequence number.

19. The method of claim 18, further comprising generating a checksum for the offset to the sequence number.

20. The method of claim 19, further comprising inserting the checksum in a predetermined position in the offset sequence number.

21. The method of claim 8, further comprising:
   a. generating a first checksum for an offset to the sequence number;
   b. inserting the first checksum in a predetermined position in the offset to the sequence number;
   c. generating a second checksum for the offset to the sequence number; and
   d. inserting the second checksum in a second predetermined position in the offset to the sequence number.

22. The method of claim 8, further comprising:
   receiving input from a recipient specifying a print re-order number;
   generating a print of the image associated with the print reorder number; and
   sending the print to the recipient associated with the print re-order number.

23. The method of claim 8, wherein the order comprises a single transaction sequence.

24. The method of claim 23, wherein the single transaction sequence comprises a single charge to a financial instrument.

25. A computer readable medium to facilitate photographic print re-ordering, comprising instructions to encode a plurality of photographic prints with identifiers, each identifier being unique to one of the photographic prints and identifying a recipient of the photographic print, properties of the photographic print, and an originator of the photographic print, wherein the instructions to encode further comprises instructions to embed one or more error detection characters in the identifier.

26. A computer readable medium to facilitate photographic print re-ordering, comprising instructions to encode a plurality of photographic prints with identifies, each identifier being unique to one of the photographic prints and identifying a recipient of the photographic print, properties of the photographic print, and an originator of the photographic print, wherein the instructions to encode further comprises instructions to embed one or more checksum values in the identifier.

27. The computer readable medium of claim 26, wherein the checksum applies a modulo function to the identifier.

28. A computer readable medium to facilitate photographic print re-ordering, comprising instructions to encode a plurality of photographic prints with identifiers, each identifier being unique to one of the photographic prints and identifying a recipient of the photographic print, properties of the photographic print and an originator of the photographic print, further comprising instructions to add an offset to a sequence number.

29. A computer readable medium to facilitate photographic print re-ordering, comprising instructions to encode a plurality of photographic prints with identifiers, each identifier being unique to one of the photographic prints and identifying a recipient of the photographic print, properties of the photographic print, and an originator of the photographic print, further comprising instructions to generate a checksum for the offset to the sequence number.

30. The computer readable medium of claim 29, further comprising instructions to insert the checksum in a predetermined position in the offset sequence number.

31. A computer readable medium to facilitate photographic print re-ordering, comprising instructions to encode a plurality of photographic prints with identifiers, each identifier being unique to one of the photographic prints and identifying a recipient of the photographic print properties of the photographic print, and an originator of the photographic print, further comprising instructions to:

generate a first checksum for an offset sequence number;

insert the first checksum in a predetermined position in the offset sequence number;

generate a second checksum for the offset sequence number; and insert the second checksum in a second predetermined position in the offset sequence number.

32. A computer-implemented method of personalizing image prints, the method comprising:

receiving an order designating an image and a plurality of recipients to receive a print of the image;

printing print-specific information on each of the image prints; and distributing the image prints to their respective recipients, wherein the recipient-specific information comprises a textual message for one or more of the recipients and wherein the textual message is specified by a user that placed the order.

33. The method of claim 32 wherein the user specifies a different textual message for each different recipient.

34. The method of claim 32 wherein the user specifies a single textual message for all of the recipients.

35. The method of claim 32 wherein the user is able to specify a different textual message, or no message, on a individual recipient basis.

* * * * *

UNITED STATES PATENT AND TRADEMARK OFFICE
CERTIFICATE OF CORRECTION

PATENT NO. : 6,657,702 B1
DATED : December 2, 2003
INVENTOR(S) : Jimmy Ping Fai Chui It is certified that error appears in the above-identified patent and that said Letters Patent is hereby corrected as shown below:

<u>Title page,</u>
Item [75], Inventors, "Jimmy Pig Fai Chui" should read -- Jimmy Ping Fai Chui --.

Signed and Sealed this

Fourth Day of October , 2005

JON W. DUDAS
*Director of the United States Patent and Trademark Office*